(12) United States Patent
Liu

(10) Patent No.: US 12,323,541 B2
(45) Date of Patent: Jun. 3, 2025

(54) PRE-EXECUTION OF BLOCK CHAIN TRANSACTION IN PARALLEL DURING BLOCK CONSENSUS

(71) Applicant: Tencent Technology (Shenzhen) Company Limited, Guangdong (CN)

(72) Inventor: Qucheng Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 270 days.

(21) Appl. No.: 18/143,511

(22) Filed: May 4, 2023

(65) Prior Publication Data

US 2023/0275771 A1    Aug. 31, 2023

Related U.S. Application Data

(63) Continuation of application No. PCT/CN2022/112373, filed on Aug. 15, 2022.

(30) Foreign Application Priority Data

Sep. 24, 2021   (CN) .......................... 202111120951.9

(51) Int. Cl.
    *H04L 29/06*    (2006.01)
    *H04L 9/00*     (2022.01)
    *H04L 9/08*     (2006.01)

(52) U.S. Cl.
    CPC ............. *H04L 9/50* (2022.05); *H04L 9/0819* (2013.01)

(58) Field of Classification Search
    CPC .. G06F 21/62; G06F 21/6209; G06F 21/6218; G06F 21/6227; G06F 21/64;
    (Continued)

(56) References Cited

U.S. PATENT DOCUMENTS

2020/0074456 A1* 3/2020 Coleman .............. G06Q 20/401
2020/0327545 A1* 10/2020 Xie ....................... G06Q 20/223
(Continued)

FOREIGN PATENT DOCUMENTS

CN    112884587 A    6/2021
CN    113256424 A    8/2021
(Continued)

OTHER PUBLICATIONS

International Search Report in PCT/CN2022/112373, mailed Nov. 16, 2022, 5 pages.
(Continued)

*Primary Examiner* — Malcolm Cribbs
(74) *Attorney, Agent, or Firm* — ArentFox Schiff LLP

(57) ABSTRACT

A transaction data processing method includes executing M transactions among N transactions in parallel during a process of packing the N transactions into a block and performing block consensus on the block, to obtain first transaction execution results. The method further includes identifying, after the block consensus succeeds, transactions identical to the M transactions as a first type of transactions in the block, and classifying the first transaction execution results associated with the M transactions as pre-execution transaction execution results. The method further includes identifying transactions in the block other than the first type of transactions as a second type of transactions, and executing, after the block consensus succeeds, the second type of transactions in parallel to obtain second transaction execution results. The method further includes combining the pre-execution transaction execution results with the second transaction execution results in sequence.

20 Claims, 8 Drawing Sheets

(58) Field of Classification Search
CPC .... G06F 16/1824; G06F 21/44; G06F 21/629; G06F 16/2379; G06F 16/9027; H04L 9/0643; H04L 9/30; H04L 2209/38; H04L 9/0637; H04L 9/0618; H04L 9/3247; H04L 9/3239; H04L 9/3263; H04L 2209/56; H04L 9/0656; G06Q 20/06; G06Q 20/382; G06Q 20/401; G06Q 2220/00; G06Q 20/381; G06Q 40/04; G06Q 20/3825; G06Q 20/3827; G06K 9/00577; G06K 2009/00583
See application file for complete search history.

(56) References Cited

U.S. PATENT DOCUMENTS

2020/0349568 A1* 11/2020 Feng ................. H04L 9/3239
2022/0358119 A1* 11/2022 Shao ................. G06F 16/2379

FOREIGN PATENT DOCUMENTS

| CN | 113409047 A | 9/2021 |
|----|-------------|--------|
| CN | 113568981 A | 10/2021 |

OTHER PUBLICATIONS

Office Action in CN202111120951.9, mailed Nov. 9, 2021, 11 pages.
Written Opinion in PCT/CN2022/112373, mailed Nov. 16, 2022, 5 pages.

* cited by examiner

PRE-EXECUTION OF BLOCK CHAIN TRANSACTION IN PARALLEL DURING BLOCK CONSENSUS

RELATED APPLICATIONS

This application is a continuation of International Application No. PCT/CN2022/112373, filed on Aug. 15, 2022, which claims the priority to Chinese patent application No. 202111120951.9, filed on Sep. 24, 2021, and entitled "TRANSACTION DATA PROCESSING METHOD AND APPARATUS, DEVICE, AND MEDIUM." The entire disclosures of the prior applications are hereby incorporated by reference in their entirety.

FIELD OF THE TECHNOLOGY

This application relates to the technical field of block chains, including a transaction data processing method and apparatus, a device, and a medium.

BACKGROUND OF THE DISCLOSURE

At present, in a block chain system, when a certain block chain node (for example, a block proposer) receives a transaction transmitted by any block chain client, it is necessary to perform transaction broadcast and transaction validation on this transaction in the block chain system. Therefore, when the block proposer packs thousands of transactions after transaction validation succeeds into a certain block (for example, block X), block consensus can be performed on the block (for example, block X), so that all transactions in the block (for example, block X) can be executed in parallel uniformly according to an existing transaction execution scheme after the block consensus succeeds.

Once all the transactions in the block (for example, block X) are executed in parallel within the same time period according to the aforementioned transaction execution scheme, there is a phenomenon of system resource preemption due to the large number of transactions executed in parallel, so that it takes a long time to schedule system resources, thereby reducing the processing efficiency of the entire block.

SUMMARY

According to various embodiments provided in this disclosure, a transaction data processing method and apparatus, a device, and a medium are provided.

In an embodiment, a transaction data processing method, performed by a block chain node, includes obtaining N transactions in a transaction pool, and executing M transactions among the N transactions in parallel during a process of packing the N transactions into a block and performing block consensus on the block, to obtain first transaction execution results associated with the M transactions. M is a positive integer less than or equal to N. The method further includes identifying, after the block consensus succeeds, transactions identical to the M transactions as a first type of transactions in the block, and classifying the first transaction execution results associated with the M transactions as pre-execution transaction execution results of the first type of transactions. The method further includes identifying transactions in the block other than the first type of transactions as a second type of transactions, and executing, after the block consensus succeeds, the second type of transactions in parallel to obtain second transaction execution results associated with the second type of transactions. The method further includes combining the pre-execution transaction execution results with the second transaction execution results in sequence based on transaction execution serial numbers of the N transactions in the block, to obtain a sequential combination execution result associated with a block cache of the block.

In an embodiment, a transaction data processing apparatus includes processing circuitry configured to obtain N transactions in a transaction pool, and execute M transactions among the N transactions in parallel during a process of packing the N transactions into a block and performing block consensus on the block, to obtain first transaction execution results associated with the M transactions, M being a positive integer less than or equal to N. The processing circuitry is further configured to identify, after the block consensus succeeds, transactions identical to the M transactions as a first type of transactions in the block, and classify the first transaction execution results associated with the M transactions as pre-execution transaction execution results of the first type of transactions. The processing circuitry is further configured to identify transactions in the block other than the first type of transactions as a second type of transactions, and execute, after the block consensus succeeds, the second type of transactions in parallel to obtain second transaction execution results associated with the second type of transactions. The processing circuitry is further configured to combine the pre-execution transaction execution results with the second transaction execution results in sequence based on transaction execution serial numbers of the N transactions in the block, to obtain a sequential combination execution result associated with a block cache of the block.

In an embodiment, a non-transitory computer-readable storage medium stores computer-readable instructions thereon, which, when executed by processing circuitry, cause the processing circuitry to perform a transaction data processing method. The method includes obtaining N transactions in a transaction pool, and executing M transactions among the N transactions in parallel during a process of packing the N transactions into a block and performing block consensus on the block, to obtain first transaction execution results associated with the M transactions. M is a positive integer less than or equal to N. The method further includes identifying, after the block consensus succeeds, transactions identical to the M transactions as a first type of transactions in the block, and classifying the first transaction execution results associated with the M transactions as pre-execution transaction execution results of the first type of transactions. The method further includes identifying transactions in the block other than the first type of transactions as a second type of transactions, and executing, after the block consensus succeeds, the second type of transactions in parallel to obtain second transaction execution results associated with the second type of transactions. The method further includes combining the pre-execution transaction execution results with the second transaction execution results in sequence based on transaction execution serial numbers of the N transactions in the block, to obtain a sequential combination execution result associated with a block cache of the block.

The details of one or more embodiments of this disclosure are set forth in the accompanying drawings and the description below. Other features, objectives, and advantages of this disclosure will be apparent from the specification, and drawings, and claims.

BRIEF DESCRIPTION OF THE DRAWINGS

In order to illustrate the embodiments of this disclosure, the drawings used in the description of the embodiments or the prior art are briefly introduced below. The drawings in the description below are some embodiments of this disclosure, and those of ordinary skilled in the art can obtain other drawings according to these drawings provided herein.

DESCRIPTION OF EMBODIMENTS

The technical schemes in the embodiments of this disclosure will be clearly and completely described below with reference to the drawings in the embodiments of this disclosure, and it is obvious that the described embodiments are only a part of the embodiments of this disclosure, but not all of them. Based on the embodiments of this disclosure, all other embodiments obtained by those ordinarily skilled in the art without creative effort shall fall within the protection scope of this disclosure.

Figure 1:
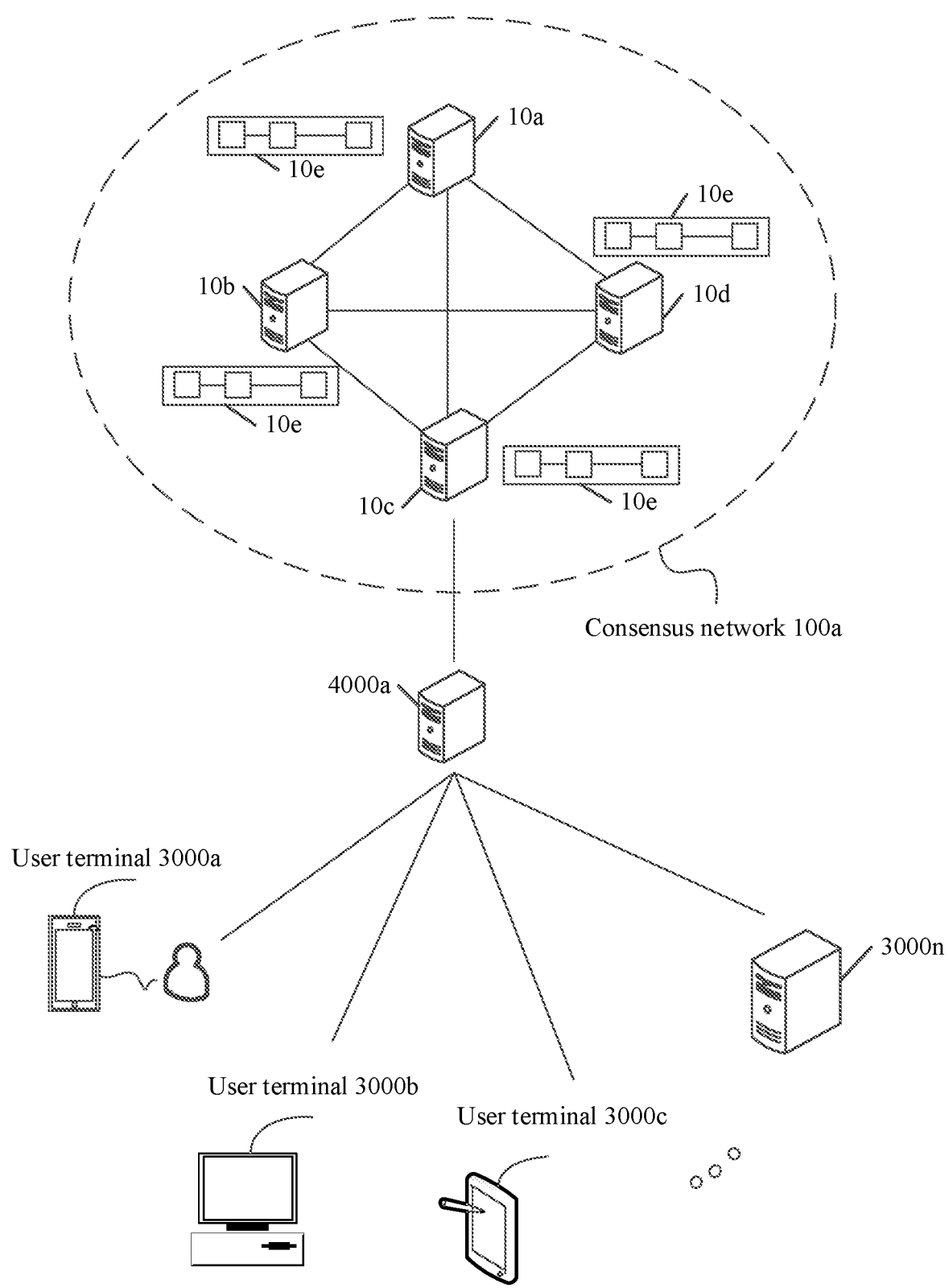
FIG. 1 is a schematic structural diagram of a network architecture according to an embodiment of this disclosure.

Referring to FIG. 1, FIG. 1 is a schematic structural diagram of a network architecture according to an embodiment of this disclosure. The network architecture shown in FIG. 1 can be applied to a block chain system which can be a distributed system formed by connecting multiple nodes in a manner of network communication. The block chain system may include, but is not limited to, a block chain system corresponding to a consortium block chain.

It can be understood that a block chain is a new-type application mode of a computer technology such as distributed data storage, peer-to-peer transmission, a consensus mechanism, and an encryption algorithm. It is mainly used for organizing data in a chronological order and encrypting the data into ledgers, so that the data cannot be tampered and forged, but can be verified, stored and updated. The block chain is essentially a decentralization database. Each node in the database stores an identical block chain. A block chain network divides nodes into consensus nodes and simplified payment verification (SPV) nodes. The consensus nodes can be responsible for the consensus of the entire block chain network, that is, the consensus nodes can be consensus nodes in the block chain network.

It can be understood that the block chain system may include a smart contract. The smart contract can be understood as a code that is executed by various block chain nodes (including the consensus nodes), and the smart contract can execute any logic and obtain a result. For example, a user may invoke a smart contract that has been deployed on the block chain by initiating a transaction request through a block chain client, and then a SPV node (or a service node) on the block chain may transmit the transaction request to consensus nodes to invoke the smart contracts running in the various consensus nodes to execute a transaction requested by the user. It is understood that the block chain may include one or more smart contracts, and these smart contracts may be distinguished by contract invoking addresses, contract identity documents (IDs) or contract names, and the transaction request initiated by the block chain client may also carry the contract invoking addresses or contract IDs or contract names of the smart contracts to specify a smart contract that needs to be run. If the smart contract specified by the block chain client is a contract with data needing to be read (that is, a service contract), the various consensus node will access local caches established in respective storage layers to read data; finally, the various consensus nodes will verify whether respective transaction execution results are consistent with each other (that is, a consensus is reached); and if the transaction execution results are consistent, the transaction execution results may be stored to the respective local caches and local storages, and the transaction execution results of the above transaction service may be returned to the block chain client. The local cache here is a system internal memory established in the storage layer, and the local storage here is a hard disk space established in the storage layer for data storage. Thus, when a certain consensus node goes down or a system failure occurs, there is no phenomenon that data reading cannot be performed because data in the system internal memory disappears, that is, the consensus node can also read data via the local storage established in the storage layer.

It is understood that the network architecture shown in FIG. 1 may include a consensus node cluster, an SPV node cluster and a user terminal cluster. The consensus node cluster may include a plurality of consensus nodes. The plurality of consensus nodes here may specifically include node 10a, node 10b, node 10c, and node 10d shown in FIG. 1. As shown in FIG. 1, node 10a, node 10b, and node 10d may be respectively connected to node 10c through a network, to form a core consensus network. The core consensus network may be the consensus network 100a shown in FIG. 1. It can be understood that in the consensus network 100a, node 10a, node 10b, and node 10d may all perform data interaction through network connection with node 10c. In addition, the user terminal cluster may include a plurality of user terminals. The plurality of user terminals here may specifically include user terminal 3000a, user terminal 3000b, . . . , and user terminal 3000c shown in FIG. 1. As shown in FIG. 1, user terminal 3000a, user terminal 3000b, . . . , and user terminal 3000c may be respectively connected to node 10c via a network, so as to perform data interaction through the network connection with node 10c. In addition, a SPV node cluster may include a plurality of SPV nodes. The plurality of SPV nodes may specifically include server 4000a and server 4000b shown in FIG. 1. As shown in FIG. 1, server 4000a and server 4000b may be respectively connected to node 10c via a network, so as to perform data interaction through the network connection with node 10c. It is understood that in some embodiments, when the user terminals in the user terminal cluster are integrated with and run decentralization APPs, these user terminals integrated with the decentralization APPs may be used as SPV nodes in the SPV node cluster.

In this embodiment of this disclosure, each consensus node (for example, node 10a, node 10b, node 10c, and node 10d) in the consensus network 100a may be collectively referred to as a block chain node. It is understood that these block chain nodes can all be used for maintaining the same block chain (for example, block chain 10e shown in FIG. 1). A Peer to Peer (P2P network) may be formed between any two block chains in the consensus network 100a. The P2P network may adopt a P2P protocol. The P2P protocol is an application layer protocol running over a Transmission Control Protocol (TCP). In a distributed system, any device such as a server and a terminal may be added as a block chain node. Each block chain node may include a hardware layer, an intermediate layer, an operating system layer and an application layer.

It can be understood that in this embodiment of this disclosure, one block chain node may be bound to any role (for example, any individual user, any enterprise, any institution and other entity objects) accessing the block chain network, so that the block chain network composed of these block chain nodes is collectively referred to as a consortium block chain network. Therefore, node 10a, node 10b, node 10c, and node 10d shown in FIG. 1 may have a one-to-one correspondence relationship with corresponding roles (that is, entity objects in corresponding service scenes) that need to be connected to the consortium block chain network. The service scenes here may include an electronic bill scene, a social scene, a credit purchase scene, a credit scene, and the like. At this time, a target service in the corresponding service scene may specifically include an electronic bill service, a social service, a credit purchase service, a credit service, and the like, and the specific services in the corresponding service scenes will not be listed one by one here.

It can be understood that since each entity object may correspond to one block chain node, in this embodiment of this disclosure, the entity objects serving as the above-mentioned enterprise users (foregoing enterprises) are taken as an example. The block chain nodes associated with each enterprise user may be the same block chain node (for example, node 10c shown in FIG. 1 may perform data interaction with user terminals corresponding to a plurality of enterprise users). For example, in a block chain electronic bill system, the electronic bill service (such as a registration service, an invoicing service, and a bill transfer service) corresponding to each invoicing enterprise can be collectively referred to as a transaction. Invoicing enterprise A may perform data interaction with node 10c shown in FIG. 1 through user terminal 3000a shown in FIG. 1 to complete a corresponding transaction. By analogy, invoicing enterprise may perform data interaction with node 10c shown in FIG. 1 through user terminal 3000b shown in FIG. 1 to complete a corresponding transaction. Invoicing enterprise C perform data interaction with node 10c shown in FIG. 1 through user terminal 3000c shown in FIG. 1 to complete a corresponding transaction.

It can be understood that in this embodiment of this disclosure, the above entity objects (for example, invoicing enterprise A, invoicing enterprise B, and invoicing enterprise C) that transmits a transaction request for an electronic bill service may be collectively referred to as a service object; block chain nodes that are used for receiving the transaction request transmitted by the service object (for example, invoicing enterprise A, invoicing enterprise B, and invoicing enterprise C) may be collectively referred to as an SPV node; and block chain nodes participating in the consensus of the transaction request may also be collectively referred to as the above consensus node.

Since node 10c described above can perform data synchronization with other block chain nodes in network connection (also referred to as session connection), node 10c described above can synchronize corresponding service data information from other block chain nodes (for example, synchronize the transaction requests sent by other enterprise users from other block chain nodes); and at this time, the consensus nodes associated with each enterprise user can be different block chain nodes. For example, invoicing enterprise A may also perform data interaction with node 10c shown in FIG. 1 through user terminal 3000a shown in FIG. 1; invoicing enterprise B may also perform data interaction with node 10b shown in FIG. 1 through user terminal 3000b shown in FIG. 1; and invoicing enterprise C may also perform data interaction with node 10a shown in FIG. 1 through user terminal 3000c shown in FIG. 1. Since these nodes in the block chain network will maintain the same block chain, a network load in the block chain network can be effectively balanced by means of randomly allocating the transaction requests sent by different user terminals to the block chain nodes associated with the above-mentioned block chain 10e, so that the processing efficiency for service data corresponding to the corresponding services can be improved.

For another example, in a credit system, a credit service requested by a service object (for example, the user corresponding to user terminal 3000a) may be understood as another transaction. A target user may perform data interaction with node 10c shown in FIG. 1 through user terminal 3000a shown in FIG. 1 to transmit a transaction request for the corresponding service to node 10c shown in FIG. 1. That is, in the credit system, one block chain node may be configured for each user accessing the credit system, to receive the transaction request transmitted by the corresponding user. It is understood that the service object requesting the aforementioned credit service may include an individual user, an enterprise user, and the like, and the user type of the service object will not be limited here.

It can be understood that for each transaction in the block chain network, a transaction processing cycle of the transaction includes a plurality of data processing stages below: a transaction generation stage, a transaction broadcasting stage, a transaction validation stage, a transaction packing stage, a block check stage, a consensus reaching stage, a transaction execution stage, and a save-to-ledger stage. However, the inventors have found in practice that: A consensus node has a certain service processing duration in the transaction packing stage, the block check stage, and the consensus reading stage (namely, a process from transaction packing to block consensus), which means that the consensus node has a certain execution blank period within the service processing duration. In order to avoid waste of system resources within the execution blank period, the embodiments of this disclosure propose an improved transaction processing cycle, so that within the improved transaction processing cycle, the consensus node can execute, in advance in a transaction preprocessing stage corresponding to the foregoing service processing duration, some (for example, M transactions) of N transactions obtained from a transaction pool. In this way, after consensus succeeds, other unexecuted transactions in a block after a consensus succeed can be further executed in parallel in the improved transaction execution stage.

It can be seen therefrom that when an SPV node receives a transaction request transmitted by a service object via a block chain client, the SPV node can forward the transaction request initiated by the service object to a consensus node, to perform, via the consensus node, validity validation on the transaction request initiated by the target user. In this way, when the validity validation succeeds, the consensus node can add, to its own local transaction pool, transactions of the transaction request transmitted by the service object, to pack a transaction list containing the transactions into a block subsequently, so that the consensus nodes in the consensus network 100a can perform block consensus on the packed block. Thus, the transactions in the transaction list obtained from the transaction pool can be executed in parallel in advance during the process from transaction packing to block consensus, so as to make full use of the system resources in a transaction thread pool associated with the transaction pool in this process.

Figure 2:
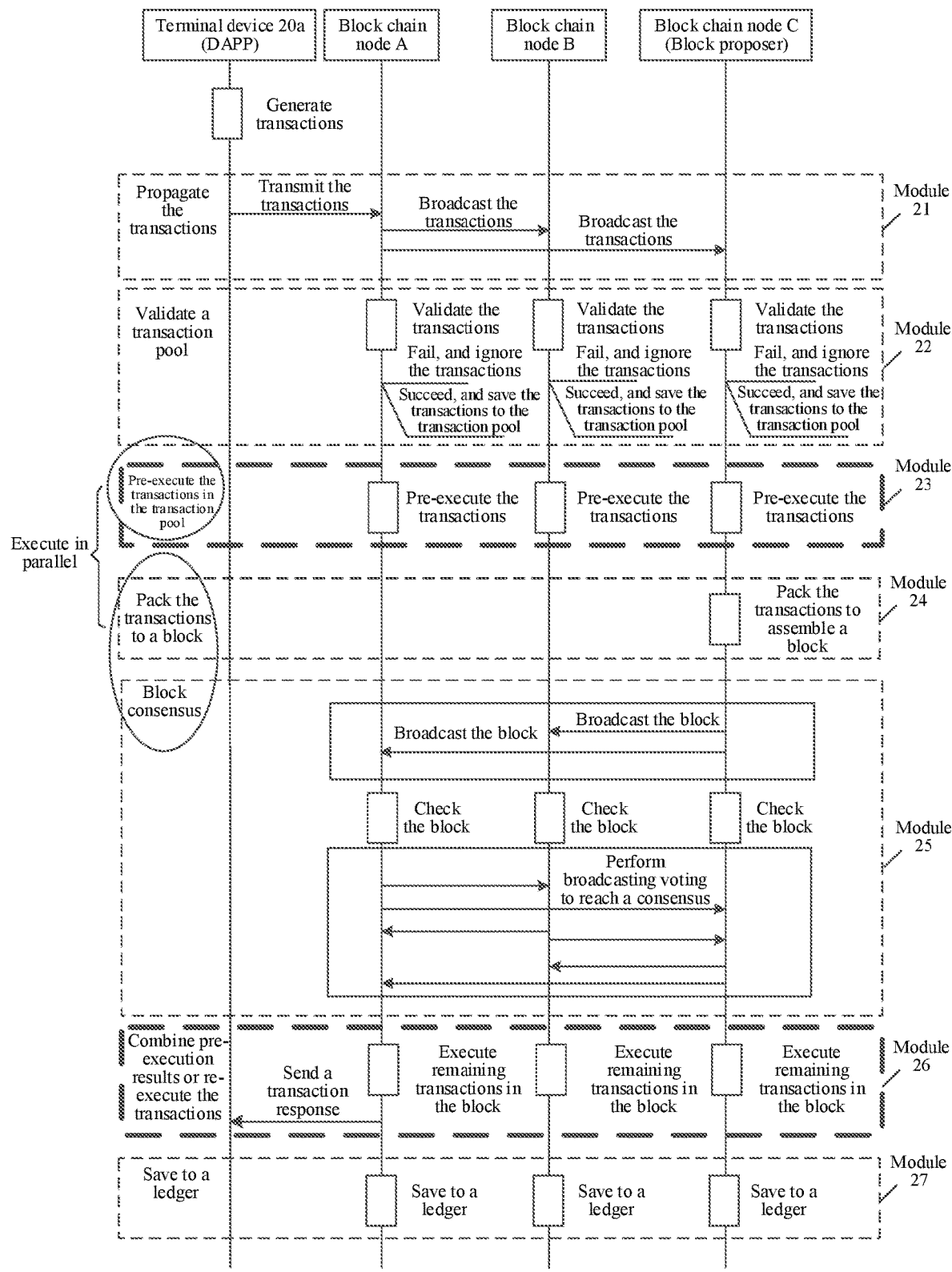
FIG. 2 is a schematic diagram of a scene of a transaction processing cycle provided by an embodiment of this disclosure.

To facilitate understanding, further, referring to FIG. 2, FIG. 2 is a schematic diagram of a scene of a transaction processing cycle provided by an embodiment of this disclosure. Block chain nodes shown in FIG. 2 may include a terminal device 20a shown in FIG. 2 and integrated with a decentralization APP, block chain node A, block chain node B, and block chain node C. It is be understood that in this embodiment of this disclosure, the terminal device 20a integrated with the decentralized application may be the above SPV node. For example, the terminal device 20a may be user terminal 3000a in the corresponding embodiment of FIG. 1. Similarly, block chain node A, block chain node B, and block chain node C shown in FIG. 2 may be the above-mentioned consensus nodes. For example, block chain node A may be consensus node 10c in the above-mentioned embodiment corresponding to FIG. 1; block chain node B may be consensus node 10b in the above-mentioned embodiment corresponding to FIG. 1; and block chain node C may be consensus node 10a in the above-mentioned embodiment corresponding to FIG. 1.

For ease of understanding, in the embodiments of this disclosure, the decentralization APP (DAPP) integrated on the terminal device 20a shown in FIG. 2 can be collectively referred to as the aforementioned block chain client. It is understood that, in this embodiment of this disclosure, the block chain client may also be independently deployed on other terminal devices, so that the other terminal devices may interact data with the terminal device 20a shown in FIG. 2 through the block chain client. A specific deployment manner of the block chain client will not be limited here. It is understood that the terminal device 20a shown in FIG. 2 may be a user terminal or a server accessing a block chain network.

It can be understood that block chain node C can be a block proposer that is elected by the above block chain system from a plurality of consensus nodes contained in a core consensus network and is used for packing and assembling a block. At this time, block chain node A and block chain node B may be consensus nodes participating in block consensus.

As shown in FIG. 2, when a block chain client is integrally deployed on the terminal device 20a, the terminal device 20a may receive, in the above transaction generation stage, service data inputted by a service object (for example, a user) via the block chain client. For example, in the above block chain electronic bill scene, the service data here may specifically include asset transfer party information, asset receiver party information, an amount of transferred assets, and the like.

Further, the block chain client in the terminal device 20a may pack the service data inputted by the foregoing service object into a transaction (for example, transaction Tx), and may then transmit, in the foregoing transaction generation stage or transaction broadcasting stage, the transaction (for example, transaction Tx) generated by packing to block chain node A shown in FIG. 2 via a transaction propagation module 21 (referred to as module 21) shown in FIG. 2.

It can be seen therefrom that in the transaction generation stage, a user can input corresponding service parameters via the above-mentioned DAPP. At this time, the DAPP may pack the service parameters (namely, the foregoing service data) inputted by the user into a transaction and transmit same to a certain block chain node (for example, block chain node A shown in FIG. 2).

As shown in FIG. 2, at this time, block chain node A may further broadcast the received transaction (for example, transaction Tx) to the entire block chain network (for example, to the core consensus network in the entire block chain network) via the transaction propagation module 21 (referred to as module 21) shown in FIG. 2 in the transaction broadcasting stage. Specifically, as shown in FIG. 2, block chain node A may broadcast, via the transaction propagation module 21 (referred to as module 21) on the basis of its currently maintained node identifier list, the currently received transaction (for example, transaction Tx) to block chain node B having a network connection relationship with block chain node A, and may broadcast, via the transaction propagation module 21 (module 21), the currently received transaction (for example, transaction Tx) to block chain node C having a network connection relationship with block chain node A at the same time. It is understood that the node identifier list here may be used for recording in real time block chain nodes currently having network connection relationships with block chain node A.

It can be seen therefrom that in the transaction broadcasting stage: In the block chain network, any block chain node (for example, block chain node A, block chain node B, or block chain node C shown in FIG. 2 above) may broadcast the currently received transaction to the entire block chain network via the transaction propagation module 21 (referred to as module 21).

Further, as shown in FIG. 2, in the transaction validation stage, block chain node A, block chain node B, and block chain node C may all perform, via a transaction pool validation module 22 (referred to as module 22) shown in FIG. 2, transaction validation on the transactions (for example, transaction Tx) currently received by themselves, and may further write, when the transaction validation succeeds (for example, both transaction signature validation and transaction duplicate validation succeeds), the transactions (for example, transaction Tx) currently received by themselves to their local transaction pools. When the transaction validation fails (for example, the transaction signature validation and/or the transaction duplicate validation fails), block chain node A, block chain node B, and block chain node C described above may also ignore the transactions (for example, transaction Tx) currently received by themselves or reject to write the transactions (for example, transaction Tx) to their local transaction pools.

Thus, in the transaction validation stage: In the block chain network, after receiving the transaction, any block chain node (for example, block chain node A, block chain node B, or block chain node C above shown in the FIG. 2) may perform the transaction signature validation on the transaction, and may further perform transaction duplicate validation on the transaction via a block chain ledger (DB), so that when both the transaction signature validation and the transaction duplicate validation succeed, the transaction may be written to the corresponding transaction pool.

To facilitate understanding, this embodiment of this disclosure takes an example in which block chain node C shown in FIG. 2 serving as a block proposer is a block chain node (namely, a computer device) in the block chain network, to explain a specific process of pre-executing N transactions in a transaction pool in parallel in block chain node C via a transaction module 23 (referred to as module 23) in a pre-execution transaction pool shown in FIG. 2. It can be understood that N here is a positive integer.

Further, as shown in FIG. 2, in order to solve the problem of waste of system resources in this process from the transaction packing stage to the block consensus stage, this embodiment of this disclosure proposes an improved transaction processing cycle. As shown in FIG. 2, this embodiment of this disclosure may add, before the transaction packing stage, a transaction preprocessing stage in which parallel execution can be achieved. As shown in FIG. 2, a module for pre-executing a transaction used by block chain node C (namely, the computer device) in the block chain network in the transaction preprocessing stage may be the transaction module 23 (referred to as module 23) in the pre-execution transaction pool shown in FIG. 2. As shown in FIG. 2, block chain node C may execute the N transactions in its own local transaction pool in parallel in advance via the transaction module 23 in the pre-execution transaction pool shown in FIG. 2, may record transactions that have been pre-executed within this service processing duration from the transaction packing stage to the block consensus stage, and may record a number of transactions that have been pre-executed within this service processing duration as M, where M can be a positive integer less than or equal to N. It can be seen therefrom that block chain node C may collectively take the transactions, which have been pre-executed, among the N transactions as M transactions among the N transactions via the transaction module 23 (referred to as module 23) in the pre-execution transaction pool shown in FIG. 2.

It can be seen therefrom that in the transaction pre-execution stage, when obtaining the N transactions from the transaction pool, block chain node C may immediately execute the N transactions in parallel via the transaction module 23 (referred to as module 23) in the transaction pre-execution pool shown in FIG. 2, instead of starting to execute the N transactions in parallel after the above service processing duration. In this way, idle system resources can be fully used within the service processing duration, and the problem of waste of system resources in the process from the transaction packing stage to the block consensus stage can be solved from the root.

It is to be understood that the block consensus stage involved in this embodiment of this disclosure at least includes the block check stage and the consensus reaching stage described above. In some embodiments, the block consensus stage may also include a block broadcasting stage and a validation result voting stage.

It is understood that within the above service processing duration, block chain node C in the block chain network may pack and assemble the N transactions obtained from the transaction pool into a block via a module 24 for packing transactions to a block (referred to as module 24) shown in FIG. 2. To facilitate understanding, in this embodiment of this disclosure, blocks obtained in the transaction packing stage can be collectively referred to as a to-be-processed block, and a duration corresponding to the transaction packing stage can be taken as a block packing duration. Thus, the to-be-processed block can be broadcast to the entire block chain network in the block consensus stage via a block consensus module 25 (referred to as module 25) of FIG. 2. Specifically, as shown in FIG. 2, in the foregoing block broadcasting stage, block chain node C may broadcast, via the block consensus module 25 (referred to as module 25) on the basis of its currently maintained node identifier list, the to-be-processed block to block chain node B having a network connection relationship with block chain node C, and may broadcast same to block chain node A having a network connection relationship with block chain node C via the block consensus module 25 (referred to as module 25).

Further, as shown in FIG. 2, block chain node C may also perform block check (for example, whether the transactions in the to-be-processed block are in the own local transaction pool can be checked) on the transactions in the to-be-processed block in the foregoing block check stage, to obtain a block check result (for example, block check result C'). It can be understood that the block check result here may include a block check success result or a block check failure result. For example, if block chain node C determines that the transactions (namely, these transactions are non-uploaded transactions) in the to-be-processed block all exist in its own local transaction pool, it can be confirmed that the check succeeds, and all transaction check results indicating a check success are collectively referred to as a block check success result. On the contrary, in an embodiment, if block chain node C determines that some transactions in the to-be-processed block do not exist in its own local transaction pool, it can be confirmed that the check fails, and transaction check results indicating a check failure can be collectively referred to as a block check failure result. At this time, block chain node C needs to perform the above transaction signature validation and transaction duplicate validation operations on these transactions of the to-be-processed block which have failed in validation, so as to ensure the accuracy of a finally obtained block check result.

As shown in FIG. 2, when block chain node C receives block check results obtained by other block chain nodes in the block check stage, for example, when block chain node C receives block check result A' obtained by block chain node A in the block check stage and block check result B' obtained by block chain node B in the block check stage, block check result A', block check result B', and block check result C' can be voted, so that it can be counted in the consensus reading stage whether most of these block check results (more than half of the block check results) indicate a check success. If block chain node C counts that most of these block check results (more than half of the block check results) indicate a check success, it can be determined that a block consensus for the foregoing to-be-processed block is reached, so that a sum of durations corresponding to the various stages (for example, the block check stage and the consensus reaching stage) can be taken as a block consensus duration in the block consensus stage. It is understood that the block consensus duration may include but is not limited to a block check duration and a voting consensus duration. At this time, block chain node C may take the to-be-processed block after consensus reaching as a submittable block. To facilitate understanding, in this embodiment of this disclosure, the submittable block can be collectively referred to as a proposal block. Thus, in the improved transaction execution stage, remaining transactions in the proposal block other than the pre-executed transactions may be executed via a combined pre-execution result or a transaction re-execution module 26 (referred to as module 26) shown in FIG. 2.

To facilitate understanding, this embodiment of this disclosure can search the proposal block (namely, the to-be-processed block after consensus reaching or the to-be-processed block succeeding in consensus) for transactions identical to the M transactions which have been pre-executed in the foregoing pre-execution stage. The found transactions may be collectively referred to as a first type of transactions, and (N−M) transactions other than the first type of transactions may be collectively referred to as a second type of transactions in the proposal block. This means that in the proposal block, the number of transactions remaining in the block represented by the second type of transactions is (N−M).

As shown in FIG. 2, in the improved transaction execution stage, any block chain node (for example, block chain node C) in the block chain network may execute the second type of transactions in the proposal block in parallel via the combined pre-execution result or the transaction re-execution module 26 (referred to as module 26) shown in FIG. 2, to obtain second transaction execution results. First transaction execution results associated with the M transactions (or to-be-processed transaction execution results of the first type of transactions) obtained in the pre-execution stage and the second transaction execution results can be combined in sequence on the basis of transaction execution serial numbers of the N transactions in the proposal block, to obtain a sequential combination result.

Further, as shown in FIG. 2, in the save-to-ledger stage, any block chain node (for example, block chain node C) in the block chain network may store, via a save-to-ledger module 27 (referred to as module 27) shown in FIG. 2, a transaction list composed of the N transactions in the foregoing proposal block (namely, the to-be-processed block succeeding in consensus) and the transaction execution results (namely, the foregoing sequential combination result) to a ledger. The ledger here may be a block chain ledger that is maintained locally by any block chain node (for example, block chain node C) in the block chain network.

It can be seen therefrom that in order to improve the block processing efficiency, this embodiment of this disclosure proposes an improved transaction processing cycle on the basis of an original transaction processing cycle, to execute the transactions in the block in stages via the improved transaction processing cycle. The improved transaction processing cycle at least includes a transaction generation stage, a transaction broadcasting stage, a transaction validation stage, a transaction preprocessing stage, a transaction packing stage, a block check stage, a consensus reaching stage, an improved transaction execution stage, and a save-to-ledger stage. As shown in FIG. 2, the block chain node (for example, block chain node C described above) in this embodiment of this disclosure can execute some transactions in a block in stages (for example, some transactions in the block can be executed in advance within the service processing duration, and some unexecuted transactions in the block can be further executed after consensus succeeds), so that system resources can be fully used in the improved transaction processing cycle, to improve the block processing efficiency.

It is understood that a part of the N transactions obtained from the transaction pool are executed in advance in the transaction pre-execution stage, so that the transaction execution results of the foregoing transaction pre-execution stage can be directly used after the consensus is subsequently reached (namely, within the above improved transaction execution stage), and another part of the transactions in the block (namely, the remaining transactions in the block other than the pre-executed transactions) can be executed in parallel in the improved transaction execution stage. In this way, in the process of combining the transaction execution results of the two stages in the improved transaction execution stage, conflict detection may be performed on these transactions in the block, to traverse these transaction execution results to find out undesired transaction execution results. That is, this embodiment of this disclosure can find out transaction execution results that satisfy a conflict detection condition from these transaction execution result, and transactions corresponding to the found transaction execution results that satisfy the conflict detection condition can be collectively referred to as conflicting transactions. The found conflicting transactions are re-executed via the module 26, and transaction execution results obtained after the conflicting transactions are re-executed are combined in sequence to a block cache corresponding to the above proposal block.

It can be seen therefrom that a process of writing a transaction in a block chain network to a block chain ledger (for example, the local ledger) can be roughly described as follows: After packing the above service data into a transaction, the block chain client can transmit the transaction to a block chain node (for example, an SPV node) in the block chain network, and the transaction will be then transmitted between these block chain nodes in a relay manner until a consensus node (for example, block chain node C described above) which is selected as a block proposer in the block chain network receives the transaction. Some transactions among the N transactions obtained from the above transaction pool may be executed in advance, or the N transactions may be packed into a block in parallel to obtain the above to-be-processed block, so that block consensus can be subsequently performed on the to-be-processed block with other consensus nodes. Therefore, after block consensus succeeds, the remaining transactions in the to-be-processed block that succeeds in consensus other than the pre-executed transactions may be executed, and then transaction execution results obtained at two different stages may be combined in sequence to obtain a sequential combination result.

The specific processes that the block chain node (for example, block chain node C) obtains first transaction execution results in the transaction pre-execution stage and obtains second transaction execution results in the improved transaction execution stage may refer to the embodiments corresponding to FIG. 3 to FIG. 7.

Figure 3:
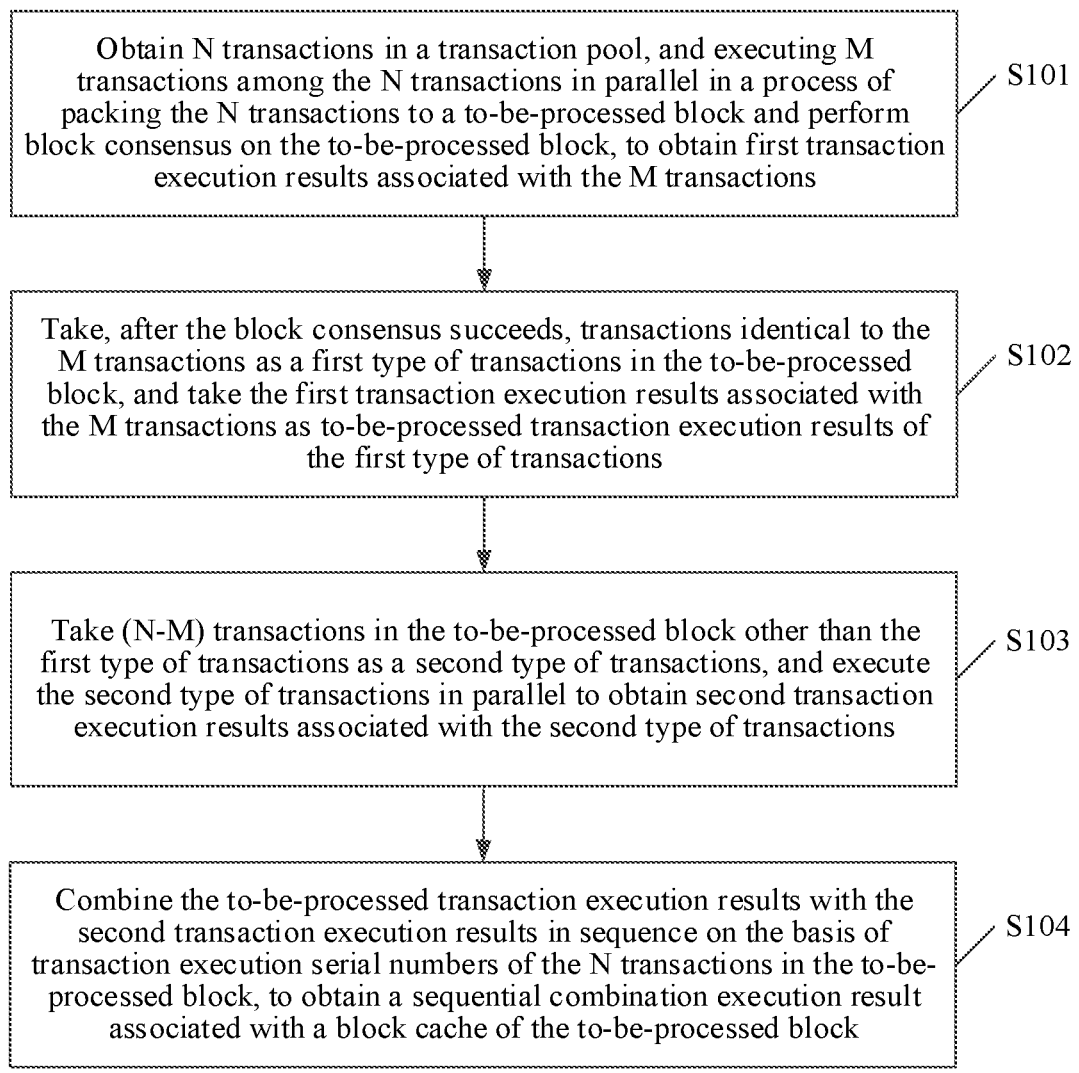
FIG. 3 is a flowchart of a transaction data processing method according to an embodiment of this disclosure.

Further, referring to FIG. 3, FIG. 3 is a flowchart of a transaction data processing method according to this disclosure. As shown in FIG. 3, the method may be implemented by a block chain node in the above block chain network. For example, the block chain node may be any consensus node in the consensus network 100a shown in FIG. 1. The method may specifically include step S101 to step S104 below:

Step S101. Obtain N transactions in a transaction pool, and executing M transactions among the N transactions in parallel in a process of packing the N transactions to a to-be-processed block and performing block consensus on the to-be-processed block, to obtain first transaction execution results associated with the M transactions, where M is a positive integer less than or equal to N. For example, N transactions in a transaction pool are obtained, and M transactions among the N transactions are executed in parallel during a process of packing the N transactions into a block and performing block consensus on the block, to obtain first transaction execution results associated with the M transactions.

Specifically, the block chain node may obtain the N transactions from a to-be-executed transaction space of the transaction pool, and write, on the basis of transaction execution serial numbers of the N transactions, the N transactions to a to-be-processed queue corresponding to the to-be-executed transaction space. Further, the block chain node may record, in the process of packing the N transactions to a to-be-processed block and performing block consensus on the to-be-processed block, a block packing duration, a block check duration and a voting consensus duration which are associated with the to-be-processed block. Further, the block chain node may determine a service processing duration associated with the N transactions on the basis of the block packing duration, the block check duration and the voting consensus duration. Further, The block chain node may execute the N transactions in the to-be-processed queue in parallel according to a transaction thread pool corresponding to the to-be-processed queue, and determine, within the service processing duration, the M transactions among the N transactions executed in parallel by a working thread in the transaction thread pool, and obtain the first transaction execution results associated with the M transactions according to transaction read data sets of the M transactions and transaction write data sets of the M transactions.

Figure 4:
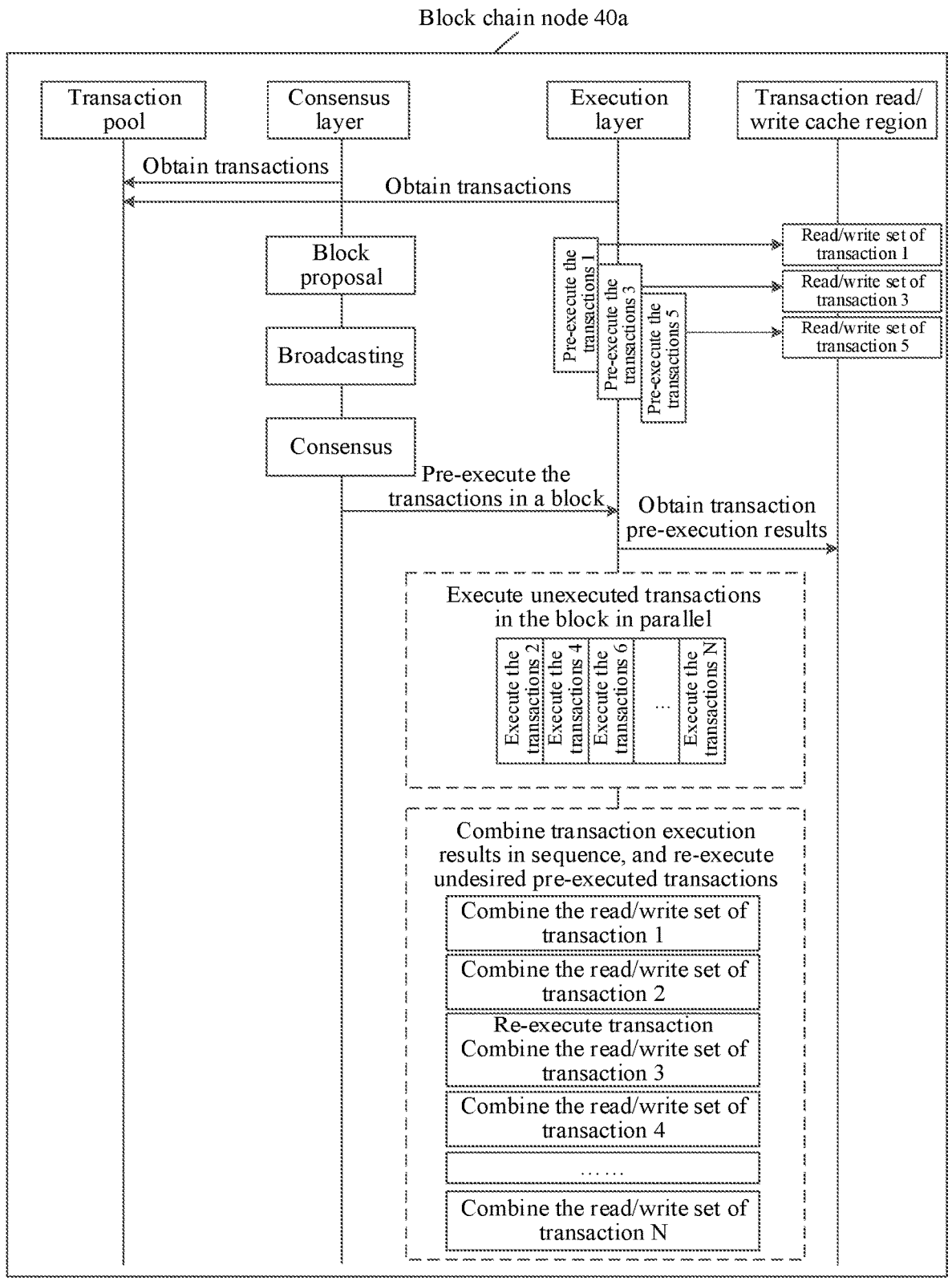
FIG. 4 is a schematic diagram of a scene of executing transactions in a block in stages according to an embodiment of this disclosure.

To facilitate understanding, further, referring to FIG. 4, FIG. 4 is a schematic diagram of a scene of executing transactions in a block in stages according to an embodiment of this disclosure. A block chain node 40a as shown in FIG. 4 may be a consensus node selected from a core consensus network for use as a block proposer.

As shown in FIG. 4, a transaction pool of the block chain node 40a may be used for storing valid transactions determined when transaction validation succeeds. The valid transactions stored in the transaction pool include, but are not limited to, pre-executed transactions that need to be executed in parallel in advance in a transaction pre-execution stage and remaining transactions in the block that need to be further executed in parallel in an improved transaction execution stage. For example, the transaction pool here may be used for storing thousands of valid transactions. The valid transactions distributed in the transaction pool are all configured with transaction identifiers used for representing transaction execution serial numbers. By the transaction identifiers, it can be determined which transactions in the transaction pool currently need to be added to a to-be-packed transaction list, so that it is convenient to subsequently traverse the transactions in the transaction list and write same to a to-be-processed queue in the transaction pre-execution stage. For example, a to-be-executed transaction space of the to-be-processed queue may be used for storing N transactions that are selected from the transaction pool and have relatively small transaction execution serial numbers.

As shown in FIG. 4, the pre-executed transactions executed by an execution layer in advance in the transaction pre-execution stage may specifically include transaction 1, transaction 3, and transaction 5 shown in FIG. 4. Similarly, as shown in FIG. 4, the remaining transactions in the block may specifically include transaction 2, transaction 4, transaction 6, . . . , transaction N shown in FIG. 4. The pre-executed transactions and the remaining transactions in the block here are transactions among the N transactions obtained from the transaction pool shown in FIG. 4. Each transaction stored in the transaction pool is a transaction received by the block chain node 40a and transmitted by other block chain nodes (for example, terminal devices integrated with the above block chain client) in the block chain network.

It can be understood that the block chain node 40a shown in FIG. 4 obtains the N transactions from the transaction pool via a consensus layer, and may schedule the transaction thread pool corresponding to the above to-be-processed queue in the transaction pre-execution stage via the execution layer shown in FIG. 4 in the whole service processing process from block proposal to broadcasting to consensus, so that the N transactions obtained from the transaction pool may be executed in parallel via the transaction thread pool.

It can be understood that the block chain node 40a may record the transactions, which have been pre-executed, among the N transactions executed in parallel in the above transaction pre-execution stage, and may record an accumulated number of the transactions, which have been executed, among the N transactions executed in parallel as M, where M may be a positive integer less than or equal to N. That is, in the whole service processing process of the consensus layer from block proposal to broadcasting to consensus shown in FIG. 4, a value of M is determined by the service processing duration corresponding to the service processing process. A longer service processing duration indicates a larger value of M. This means a larger number of transactions that can be pre-executed in the transaction pre-execution stage corresponding to the service processing duration. For example, as shown in FIG. 4, the transactions, which have been pre-executed and recorded by the block chain node 40a, among the N transactions executed in parallel via the execution layer may be three (namely, M=3) transactions shown in FIG. 4. The three (namely, M=3) transactions may specifically include transaction 1, transaction 3, and transaction 5 shown in FIG. 4.

It is understood that as shown in FIG. 4, in a case that the block chain node 40a executes the M transactions among the N transactions in advance in the transaction pre-execution stage, transaction execution results of the M transactions may be obtained. For ease of understanding, the transaction execution results of the M transactions can be collectively referred to as first transaction execution results associated with the M transactions in this embodiment of this disclosure. This means that the first transaction execution results involved in this embodiment of this disclosure may specifically include a transaction execution result of transaction 1, a transaction execution result of transaction 3, and a transaction execution result of transaction 5 shown in FIG. 4. As shown in FIG. 4, the transaction execution result of transaction 1 may include a transaction read data set and a transaction write data set (referred to as read/write set of transaction 1 shown in FIG. 4) of transaction 1. Similarly, the transaction execution result of transaction 3 may include a transaction read data set and a transaction write data set (referred to as read/write set of transaction 3 shown in FIG. 4) of transaction 3. By analogy, the transaction execution result of transaction 5 may include a transaction read data set and transaction write data set (referred to as read/write set of transaction 5 shown in FIG. 4) of transaction 5.

Further, as shown in FIG. 4, the block chain node 40a may write the transaction execution result of each transaction that has been pre-executed to a transaction cache corresponding to the corresponding transaction. For each of the N transactions, the block chain node 40a may configure, in a node internal memory, one transaction cache for each transaction. The transaction cache may specifically include a transaction write cache and a transaction read cache. It can be understood that the transaction read cache here may be configured to store a transaction read data set corresponding to the transaction. Similarly, the transaction write cache here may be configured to store a transaction write data set corresponding to the transaction. To facilitate understanding, in this embodiment of this disclosure, cache spaces corresponding to the transaction caches configured for the transactions can be collectively referred to as transaction cache regions. The transaction cache region here may be a transaction read/write cache region shown in FIG. 4.

Step S102. Take, after the block consensus succeeds, transactions identical to the M transactions as a first type of transactions in the to-be-processed block, and take the first transaction execution results associated with the M transactions as to-be-processed transaction execution results of the first type of transactions. For example, after the block consensus succeeds, transactions identical to the M transactions are identified as a first type of transactions in the block, and the first transaction execution results associated with the M transactions are classified as pre-execution transaction execution results of the first type of transactions.

Specifically, further, a block chain node (for example, the block chain node 40*a* shown in FIG. 4) may take, after the block consensus succeeds, the to-be-processed block that succeeds in the block consensus as a proposal block, and obtain, during executing the N transactions in the proposal block, the first transaction execution results associated with the M transactions from the transaction cache regions. Further, the block chain node may search the proposal block for the transactions identical to the M transactions. Further, the block chain node may take the found transactions as the first type of transactions, and take the first transaction execution results associated with the M transactions as the to-be-processed transaction execution result of the first type of transactions.

The first transaction execution results associated with the M transactions are stored in the transaction cache regions associated with the M transactions. As shown in FIG. 4 above, the transaction cache region here may be the transaction read/write cache region of FIG. 4. The transaction read/write cache region (namely, the transaction cache region) can be used for storing the read/write sets of transaction 1, transaction 3, and transaction 5 which have been executed in advance in the transaction pre-execution stage.

As shown in the FIG. 4 above, since the consensus layer can obtain N to-be-packed transactions from the transaction pool, and the execution layer can also obtain N transactions from the transaction pool, it is understood that the N transactions obtained by the execution layer from the transaction pool are all identical to the N transactions obtained by the foregoing consensus layer from the transaction pool. Therefore, with regard to the N transactions packed to the to-be-processed block by the execution layer, in a case that some (the foregoing M transactions) of the N transactions have been executed in advance via the execution layer, the block chain node may further search the N transactions (namely, transaction 1, transaction 2, transaction 3, transaction 4, transaction 5, . . . , and transaction N) contained in the to-be-processed block for the transactions identical to the M transactions (namely, transaction 1, transaction 3, and transaction 5 that have been pre-executed shown in FIG. 4 above), and then may take the found transactions (for example, transaction 1, transaction 3, and transaction 5 in the to-be-processed block) identical to the M transactions (namely, transaction 1, transaction 3, and transaction 5 that have been pre-executed shown in FIG. 4 above) as the first type of transactions. In this way, after the block consensus succeeds, namely, in the process of executing the transactions in the block shown in FIG. 4, the block chain node may directly take the transaction execution results (namely, the foregoing first transaction execution results associated with the M transactions) of the M transactions that have been pre-executed in the pre-transaction execution stage as the to-be-processed transaction execution results of the first type of transactions. Apparently, this means that the block chain node may directly obtain and use the results of the aforementioned pre-executed transactions in the process of executing the transactions in the block, without executing the first type of transactions (namely, without executing the transactions identical to the foregoing M transactions) in the block in the improved transaction execution stage, and may then execute the remaining transactions in the block in parallel in the improved transaction execution stage. Specifically, as shown in FIG. 4 above, the block chain node may further execute the unexecuted transactions (for example, execute transaction 2, transaction 4, transaction 6, . . . , and transaction N shown in FIG. 4 in parallel) in parallel in the improved transaction execution stage. To facilitate understanding, this embodiment of this disclosure may further perform following step S103, to take (N–M) transactions in the to-be-processed block other than the first type of transactions as a second type of transactions, which means that the second type of transactions here may include transaction 2, transaction 4, transaction 6, . . . , and transaction N shown in FIG. 4 above.

Step S103. Take (N–M) transactions in the to-be-processed block other than the first type of transactions as a second type of transactions, and execute the second type of transactions in parallel to obtain second transaction execution results associated with the second type of transactions. For example, transactions in the block other than the first type of transactions are identified as a second type of transactions, and, after the block consensus succeeds, the second type of transactions are executed in parallel to obtain second transaction execution results associated with the second type of transactions.

Specifically, the block chain node may take the (N–M) transactions in the proposal block other than the first type of transactions as the second type of transactions in a case that the to-be-processed block is a proposal block. For example, the second type of transactions here may include transaction 2, transaction 4, transaction 6, . . . , and transaction N shown in FIG. 4. At this time, the block chain node may further obtain service contracts associated with the second type of transactions, and then may read transaction read data sets of the second type of transactions on the basis of the service contracts associated with the second type of transactions. Further, the block chain node may execute the second type of transactions in parallel on the basis of the transaction read data sets of the second type of transactions to obtain transaction write data sets of the second type of transactions. Further, the block chain node may obtain, according to the transaction read data sets of the second type of transactions and the transaction write data sets of the second type of transactions, the second transaction execution results associated with the second type of transactions.

As shown in FIG. 4 above, the block chain node may obtain the service contracts for executing the transactions separately when executing the second type of transactions (for example, transaction 2, transaction 4, transaction 6, . . . , and transaction N shown in FIG. 4 above) in parallel. The number of the second type of transactions is (N–M), and a value of (N–M) may be an integer greater than or equal to 0.

To facilitate understanding, the number, namely N−M=2, of the second type of transactions is taken as an example. This embodiment of this disclosure may take the second type of transactions including transaction 2 and transaction 4 above as an example, to explain the specific process of executing transaction 2 and transaction 4 in parallel in the improved transaction execution stage. For example, with regard to transaction 2, when obtaining a service contract (for example, service contract 2') for executing transaction 2, the block chain node may read, via service contract 2', a transaction read data set of transaction 2 from a block cache or a block chain ledger associated with the to-be-processed block (namely, the proposal block), and may execute transaction 2 on the basis of the transaction read data set that is obtained by reading, so as to take transaction data obtained after transaction 2 is executed as a transaction write data set of transaction 2. It is understood that at this time, the block chain node may take the transaction read data set and transaction write data set of transaction 2 as a transaction execution result of transaction 2 in the improved transaction execution stage.

Similarly, with regard to transaction 4, when obtaining a service contract (for example, service contract 4') for executing transaction 4, the block chain node may read, via service contract 4', a transaction read data set of transaction 4 from a block cache or a block chain ledger associated with the to-be-processed block (namely, the proposal block), and may execute transaction 4 on the basis of the transaction read data set that is obtained by reading, so as to take transaction data obtained after transaction 4 is executed as a transaction write data set of transaction 4. It is understood that at this time, the block chain node may take the transaction read data set and transaction write data set of transaction 4 as a transaction execution result of transaction 4 in the improved transaction execution stage.

To facilitate understanding, in this embodiment of this disclosure, in the improved transaction execution stage, the transaction execution result of transaction 2 and the transaction execution result of transaction 4 can be collectively referred to as the transaction execution results associated with the second type of transactions.

It is understood that this embodiment of this disclosure can assume that, in the improved transaction execution stage, the various service contracts obtained from a contract cache of the node internal memory and are used for executing the remaining transactions remaining the block are considered to not intersect and affect each other, which means that: the transaction read data sets used for executing the various transactions and read by invoking the various service contracts (for example, service contract 2' and service contract 4' described above) for executing the remaining transactions in the block are different. Thus, the block chain node can improve the efficiency of processing the transactions in the block when executing the remaining transactions (namely, the above second type of transactions) in the block in parallel via the transaction data sets obtained by reading. In this way, after each transaction in the block has been executed, it can be possible to verify, according to the transaction execution serial numbers in the block, whether the foregoing assumption is true. That is, at this moment, the block chain node may further execute step S104 below. When each transaction in the to-be-processed block is compared one by one, it is determined whether the transaction read data sets used for executing the corresponding transactions and read via different service contracts are changed by transaction write data sets of preceding transactions in the to-be-processed block. If the transaction read data sets are changed, it indicates that the foregoing assumption is not true, and the transaction write data sets of the preceding transactions need to be taken as the transaction read data sets of the currently compared transactions to re-execute the currently compared transactions.

Step S104. Combine the to-be-processed transaction execution results with the second transaction execution results in sequence on the basis of transaction execution serial numbers of the N transactions in the to-be-processed block, to obtain a sequential combination execution result associated with a block cache of the to-be-processed block. For example, the pre-execution transaction execution results are combined with the second transaction execution results in sequence based on transaction execution serial numbers of the N transactions in the block, to obtain a sequential combination execution result associated with a block cache of the block.

Specifically, the block chain node may take, in the to-be-processed block (namely, the proposal block) transactions among the N transactions other than the first transaction as to-be-detected transactions. The first transaction is a transaction of the N transactions having a minimum transaction execution serial number. Further, the block chain node may combine and write, in a case that the first transaction is a transaction among the first type of transactions, a transaction execution result of the first transaction among the to-be-processed transaction execution results to the block cache of the to-be-processed block on the basis of the transaction execution serial number of the first transaction. Further, the block chain node may determine preceding transactions of the to-be-detected transactions on the basis of the transaction execution serial numbers of the N transactions in the to-be-processed block. The preceding transactions contain the first transaction, and the preceding transactions are transactions that are found in the to-be-processed block and have the transaction execution serial numbers earlier than the transaction execution serial numbers of the to-be-detected transactions. Further, the block chain node may take the transaction execution results corresponding to the to-be-detected transactions from the to-be-processed transaction execution results and the second transaction execution results as to-be-combined transaction execution results, obtain transaction read data sets of the to-be-detected transactions from the to-be-combined transaction execution results, obtain transaction write data sets of the preceding transactions from the block cache, and perform conflict detection on the to-be-detected transactions on the basis of the transaction write data sets of the preceding transactions, the transaction read data sets of the to-be-detected transactions, and a conflict detection condition, to obtain a conflict detection result. Further, the block chain node may take, in a case that the conflict detection result indicates that the to-be-detected transactions do not contain a to-be-detected transaction satisfying the conflict detection condition, to-be-detected transactions among the to-be-detected transactions that do not satisfy the conflict detection condition as combinable transactions, and combine, in sequence from the to-be-processed transaction execution results and the second transaction execution results, the transaction execution results corresponding to the combinable transactions, to obtain the sequential combination execution result corresponding to the block cache.

It can be understood that as shown in FIG. 4 above, in the process of executing, in the improved transaction execution stage, the transactions in the block, the block chain node may directly use the transaction execution results obtained in the transaction pre-execution stage, to obtain the to-beprocessed transaction execution results of the first type of transactions in the block. For example, the to-be-processed transaction execution results may include the transaction execution result of transaction 1, the transaction execution result of transaction 3, and the transaction execution result of transaction 5 shown in FIG. 4 above.

Further, the block chain node may also execute each unexecuted transaction (namely, the remaining transactions in the block) in the block in parallel in the improved transaction execution stage, to obtain the transaction execution result of each unexecuted transaction in the block. For example, the block chain node may obtain the transaction execution result of transaction 2 and the transaction execution result of transaction 4 after executing these transactions (for example, transaction 2 and transaction 4 above) in the block in parallel, and the transaction execution result of transaction 2 and the transaction execution result of transaction 4 obtained in the improved transaction execution stage may be collectively referred to as the aforementioned second transaction execution results.

At this time, the block chain node may combine, in sequence on the basis of the transaction execution serial numbers of the N transactions in the to-be-processed block (namely, the above proposal block), the to-be-processed transaction execution results of the first type of transactions with the second transaction execution results associated with the second type of transactions.

It is understood that in the process of combining the transaction execution results in sequence (namely, the to-be-processed transaction execution results and the second transaction execution results), the block chain node may traverse, on the basis of the transaction execution serial numbers of the N transactions in the to-be-processed block (namely, the above proposal block,) the to-be-processed transaction execution results and the second transaction execution results to determine a current to-be-combined transaction execution result, so that the block chain node may determine whether the current to-be-combined transaction execution result is desired, namely, may determine whether the current to-be-combined transaction execution result satisfies the conflict detection condition. If the current to-be-combined transaction execution result satisfies the conflict detection condition, the block chain node needs to take the transaction corresponding to the current to-be-combined transaction execution result as a conflicting transaction, and re-execute the conflicting transaction, so that a new transaction execution result obtained after the conflicting transaction is re-executed may be taken as a target transaction execution result, and the target transaction execution result of the conflicting transaction may be combined in sequence to the block cache. It is understood that at this time, the block cache may further include the transaction execution result of the preceding transaction corresponding to the conflicting transaction that has been currently combined to the block cache.

For example, the N transactions in the to-be-processed block include transaction 1, transaction 2, transaction 3, transaction 4, and transaction 5 shown in FIG. 4 above. Since transaction 1 is the transaction in the to-be-processed block having the minimum transaction execution serial number (namely, transaction 1 is the first transaction in the to-be-processed block), there is no preceding transaction before transaction 1. Thus, it can be ensured that the transaction read data set (namely, the read set of transaction 1) used for executing transaction 1 in the foregoing transaction pre-execution stage is kept consistent with transaction read data used for normally executing transaction 1. That is, the transaction read data set (namely, the read set of transaction 1) used for executing transaction 1 and read from the block chain ledger via the service contract corresponding to transaction 1 is correct. Therefore, at this moment, the block chain node may directly combine the transaction execution result of transaction 1 (namely, the read/write set of transaction 1 shown in FIG. 4 above) in the process of combining the transaction execution results in sequence, to obtain a first combined transaction execution result, and then write the transaction execution result of transaction 1 to the block cache corresponding to the to-be-processed block.

It is understood that in the above to-be-processed block, since the transaction execution serial number of transaction 1 is smaller than the transaction execution serial numbers of transaction 2, transaction 3, transaction 4, and transaction 5. For transaction 2, transaction 3, transaction 4, and transaction 5, transaction 1 may be considered a preceding transaction to transaction 2, transaction 3, transaction 4, and transaction 5. To facilitate understanding, at this time, the block chain node involved in this embodiment of this disclosure may collectively take other transactions (for example, transaction 2, transaction 3, transaction 4, and transaction 5) in the to-be-processed block (namely, the proposal block above) except the first transaction as to-be-detected transactions, so as to perform, during the combining the transaction execution results of the to-be-detected transactions in sequence, traversing to detect whether the transaction execution result of a to-be-processed transaction currently to be subjected to conflict detection satisfies the conflict detection condition.

For example, in the process of combining the transaction execution results in sequence, when the to-be-detected transaction currently to be subjected to conflict detection is transaction 2, the block chain node may detect whether the transaction read data set used during the execution of transaction 2 exists in the block cache (for example, a block write cache) of the to-be-processed block. If the transaction read data set does not exist in the block cache, it indicates that the transaction read data set used during the execution of transaction 2 and read by invoking the service contract corresponding to transaction 2 is correct (that is, the transaction write data set of the preceding transaction of transaction 2 (for example, the transaction write data set of transaction 1 that has been combined and written to the block cache) does not affect the transaction read data set of transaction 2), so that a confirmed result can be obtained according to a deterministic principle of a smart contract (by invoking the same service contract and using the same read data set). Based on this, the block chain node may consider that: Transaction 2 executed in the improved transaction execution stage (namely, in the service processing process before combining the transaction execution results in sequence) will have the same result as transaction 2 executed using a normal transaction processing process (namely, the service processing process of executing the transactions in the proposal block in sequence), Therefore, the transaction execution result of transaction 2 (for example, the transaction read data set and transaction write data set of transaction 2) can be directly combined to the block cache. It is understood that the block cache of the to-be-processed block may include a block write cache and a block read cache. For example, the block write cache may be configured to store the transaction execution result of each combinable transaction that can be combined and written to the block write cache of the block cache in the process of combining the transaction execution results in sequence. As another example, the block read cache may be configured to store service contracts that are recorded in the process of combining the transaction execution results in sequence and are invoked to execute the respective transactions.

Similarly, with regard to transaction 3, in the process of combining the transaction execution results in sequence, when the to-be-detected transaction currently to be subjected to conflict detection is transaction 3, the block chain node may detect whether the transaction read data set used for executing transaction 3 (namely, pre-executing transaction 3) exists in the block cache of the to-be-processed block. If the transaction read data set exists in the block cache and data is inconsistent, it indicates that the transaction read data set that is read by invoking the service contract corresponding to transaction 3 and is used for pre-executing transaction 3 is incorrect at this time. For example, old data on the block chain ledger is used for pre-executing transaction 3 (namely, the transaction read data set of transaction 3 read during the pre-execution of transaction 3 is old data), so that the transaction execution result (namely, the current to-be-combined transaction execution result) of transaction 3 obtained via the read old data needs to be considered as the transaction execution result satisfying the conflict detection condition.

At this time, the block chain node may regard transaction 3 as a conflicting transaction satisfying the conflict detection condition, and then needs to re-execute the conflicting transaction according to the normal transaction processing process. That is, data for executing the conflicting transaction may be preferentially read from the block cache of the to-be-processed block via the service contract of the conflicting transaction, and then the read data (for example, the transaction write data set of the preceding transaction (for example, transaction 2) of transaction 3 that has a service dependency relationship with transaction 3) may be taken as the transaction read data set of the conflicting transaction. Thus, the conflicting transaction may be re-executed on the basis of the transaction read data set of the conflicting transaction, to retrieve the transaction write data set of the conflicting transaction, and then the transaction execution result obtained after the conflicting transaction is re-executed (namely, the transaction read data set and the transaction write data set of the current conflicting transaction) may be written to the block cache.

It is understood that in this embodiment of this disclosure, the transaction execution result obtained after the conflicting transaction is re-executed may also be collectively referred to as a target transaction execution result of the current conflicting transaction, and the transaction execution result of transaction 3 obtained in the transaction pre-execution stage may be collectively referred to as an initial transaction execution result of the conflicting transaction, so that the target transaction execution result may be used to replace the initial transaction execution result in the transaction cache region shown in FIG. 4 above.

By analogy, with regard to other transactions (for example, transaction 4 and transaction 5) in the to-be-processed block, the transaction execution result of foregoing transaction 4 and the transaction execution result of foregoing transaction 5 may be taken as current to-be-combined transaction execution results in sequence, and then transactions corresponding to the current to-be-combined transaction execution results may be taken as the above to-be-detected transactions. Therefore, when the to-be-detected transactions are transaction 4 and transaction 5 respectively, the transaction execution result of foregoing transaction 4 and the transaction execution result of foregoing transaction 5 may be combined in sequence. In addition, the specific implementations of combining the transaction execution result of foregoing transaction 4 and the transaction execution result of foregoing transaction 5 may refer to the descriptions of the specific processes of combining the transaction execution result of foregoing transaction 2 and the transaction execution result of foregoing transaction 3 in sequence, and will not be described in detail here.

This embodiment of this disclosure can execute some (namely, the foregoing M transactions) of the N transactions in advance during the transaction packing, the block broadcasting and the block consensus. In this way, after the block consensus succeeds, during the further execution of the to-be-processed block, a computer device may directly take the transaction execution results of the M transactions that have been executed in advance as the transaction execution results of the first type of transactions in the to-be-processed block, so that the system resources can be rationally used in the process from the transaction packing to the block consensus. This means that: This embodiment of this disclosure only needs to execute the unexecuted (N–M) transactions in the to-be-processed block in parallel after the block consensus succeeds, without executing all the transactions in the to-be-processed block in parallel, so that the problem of preemption of the system resources caused by executing a large number of transactions in parallel can be solved from the root. This means that: This embodiment of this disclosure can improve the block processing efficiency of the whole block from the root by executing transactions in a block in parallel in stages, and can further improve the block proposing efficiency of the entire block chain network, to improve the throughput of a block chain corresponding to the entire block chain network.

Figure 5:
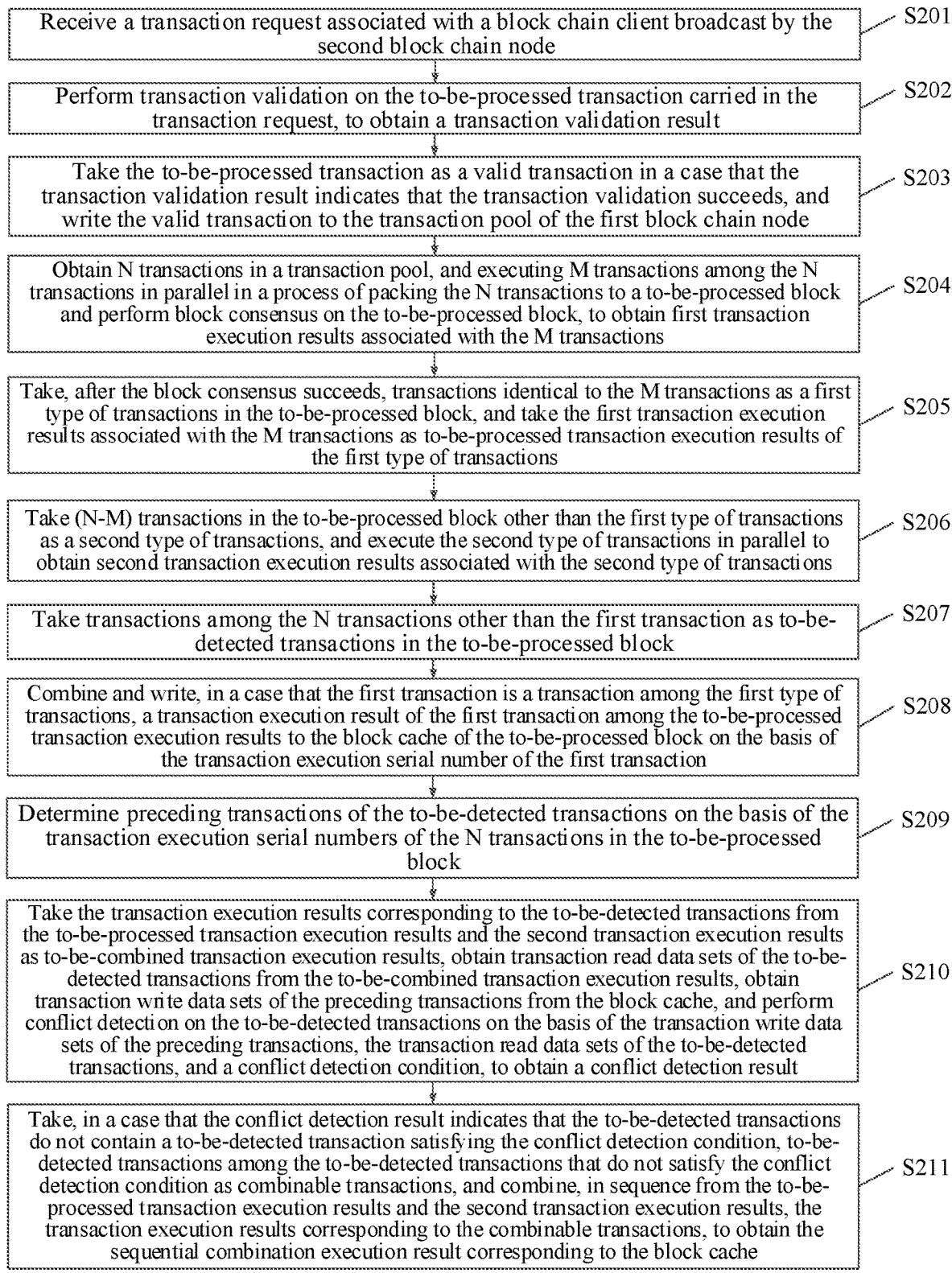
FIG. 5 is a flowchart of a transaction data processing method according to an embodiment of this disclosure.

Further, referring to FIG. 5, FIG. 5 is a flowchart of a transaction data processing method according to an embodiment of this disclosure. As shown in FIG. 5, the method may be performed by a block chain node. The block chain node may be any consensus node (for example, node 10c described above) in the consensus network 100a shown in FIG. 1 above. The method specifically includes step S201 to step S211 below:

Step S201. Receive a transaction request associated with a block chain client broadcast by a second block chain node.

Specifically, when a block chain node is a first block chain node (for example, the consensus node which is used as the block proposer in the embodiment corresponding to FIG. 2 above), the first block chain node may be used for receiving a transaction request that is broadcast by the second block chain node and is associated with the block chain client, so as to subsequently and further execute step S202 below. It is understood that the second block chain node here may be a block chain node, other than the first block chain node, in a core consensus network where the first block chain node is located. A transaction pool is a transaction pool of the first block chain node.

A to-be-processed transaction carried in the transaction request is generated after the block chain client packs service data inputted by a service object.

Of course, the first block chain node may also be used for directly receiving the transaction request associated with the block chain client, and may broadcast the received transaction request to the entire block chain network, so that other block chain nodes (for example, the second block chain node) in the block chain network execute step S202 below.

Step S202. Perform transaction validation on the to-be-processed transaction carried in the transaction request, to obtain a transaction validation result.

Specifically, the transaction request carries transaction signature information of the service object. The transaction signature information is obtained after the block chain client signs the to-be-processed transaction through an object private key of the service object. At this time, the block chain node (namely, the first block chain node) may extract the to-be-processed transaction from the transaction request, obtain a service public key corresponding to the object private key of the service object in a block chain network where the core consensus network is located, and perform signature validation on the transaction signature information via the service public key. Further, the block chain node (namely, the first block chain node) may perform, in a case that the signature validation succeeds, transaction duplicate validation on the to-be-processed transaction on the basis of a block chain ledger maintained by the block chain network, to obtain a transaction duplicate validation result. Further, the block chain node (namely, the first block chain node) may determine the transaction validation result corresponding to the to-be-processed transaction on the basis of the transaction duplicate validation result.

The specific process that the block chain node (namely, the first block chain node) performs the transaction duplicate validation on the to-be-processed transaction can be described as: obtaining, in a case that the signature validation succeeds, a transaction duplicate validator associated with the transaction pool, and searching, on the basis of the transaction duplicate validator, for an on-chain transaction identical to the to-be-processed transaction in the block chain ledger maintained by the block chain network. Further, in a case that the on-chain transaction identical to the to-be-processed transaction is not found in the block chain ledger, the block chain node (namely, the first block chain node) takes a non-duplicate-transaction duplicate validation result, indicating that the on-chain transaction identical to the to-be-processed transaction is not found in the block chain ledger, as a first transaction duplicate validation result. Based on this, the block chain node (namely, the first block chain node) may take the first transaction duplicate validation result as a transaction duplicate validation result after the transaction duplicate validation is performed on the to-be-processed transaction. In an embodiment, in a case that the on-chain transaction identical to the to-be-processed transaction is found in the block chain ledger, the block chain node (namely, the first block chain node) takes a duplicate-transaction duplicate validation result, indicating that the on-chain transaction identical to the to-be-processed transaction is found in the block chain ledger, as a second transaction duplicate validation result. Based on this, the block chain node (namely, the first block chain node) may take the second transaction duplicate validation result as a transaction duplicate validation result after the transaction duplicate validation is performed on the to-be-processed transaction.

Step S203. Take the to-be-processed transaction as a valid transaction in a case that the transaction validation result indicates that the transaction validation succeeds, and write the valid transaction to the transaction pool of the first block chain node.

After executing step S202, the block chain node (namely, the first block chain node) may also execute the following steps: taking the to-be-processed transaction as an invalid transaction in a case that the transaction validation result indicates that the transaction validation fails, and rejecting to write the invalid transaction to the transaction pool of the first block chain node.

The specific implementations of step S202 to step S203 may refer to the description of the transaction validation stage in the embodiment corresponding to FIG. 2 above, and will not be described in detail here.

Step S204. Obtain N transactions in a transaction pool, and execute M transactions among the N transactions in parallel during a process of packing the N transactions to a to-be-processed block and performing block consensus on the to-be-processed block, to obtain first transaction execution results associated with the M transactions, where M is a positive integer less than or equal to N.

Specifically, the block chain node (namely, the first block chain node) may obtain the N transactions from a to-be-executed transaction space of the transaction pool of the first block chain node, and may write, on the basis of transaction execution serial numbers of the N transactions, the N transactions to a to-be-processed queue corresponding to the to-be-executed transaction space. Further, the block chain node (namely, the first block chain node) may record, in the process of packing the N transactions to a to-be-processed block and performing block consensus on the to-be-processed block, a block packing duration, a block check duration and a voting consensus duration which are associated with the to-be-processed block. Further, the block chain node (namely, the first block chain node) may determine a service processing duration associated with the N transactions on the basis of the block packing duration, the block check duration and the voting consensus duration. Further, the block chain node (namely, the first block chain node) may execute the N transactions in the to-be-processed queue in parallel according to a transaction thread pool corresponding to the to-be-processed queue, and determine, within the service processing duration, the M transactions among the N transactions executed in parallel by a working thread in the transaction thread pool, and obtain the first transaction execution results associated with the M transactions according to transaction read data sets of the M transactions and transaction write data sets of the M transactions.

It is understood that the first transaction execution results include transaction execution results of the M transactions, and the transaction execution result of one transaction includes a transaction read data set of the transaction and a transaction write data set of the transaction. Therefore, after executing step S204 above, the block chain node (namely, the first block chain node) may also obtain a to-be-cached transaction from the M transactions, and obtain the transaction read data set of the to-be-cached transaction and the transaction write data set of the to-be-cached transaction from the transaction execution results of the M transactions. Further, the block chain node (namely, the first block chain node) may cache the transaction read data set of the to-be-cached transaction and the transaction write data set of the to-be-cached transaction to a transaction cache corresponding to the to-be-cached transaction.

It is understood that in this embodiment of this disclosure, when extracting and executing the M transactions among the N transactions in the transaction pre-execution stage, block chain node (namely, the first block chain node) uses data read from the block chain ledger. In other words, when the block chain node (namely, the first block chain node) pre-executes a transaction, because the block chain node has not reached a block consensus on the to-be-processed block within the above service processing duration, data read via a service contract is all from the block chain ledger. In the process of executing the M transactions in parallel, the block chain node (namely, the first block chain node) may separately record transaction read data (read sets) read via the service contracts of the various transactions and used for executing these transactions.

Figure 6:
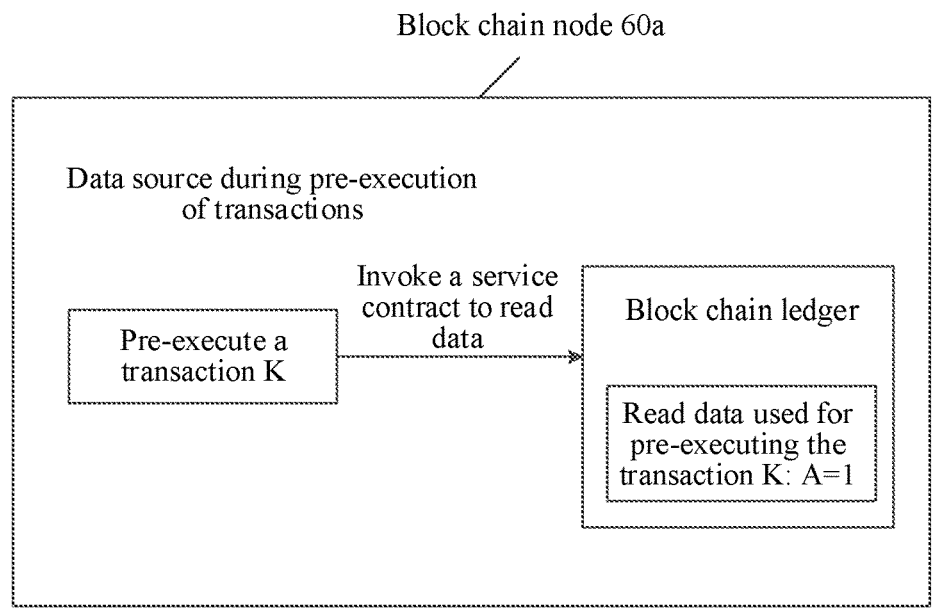
FIG. 6 is a schematic diagram of a data source during pre-execution of transactions in a transaction pre-execution stage according to an embodiment of this disclosure.

To facilitate understanding, further, referring to FIG. 6, FIG. 6 is a schematic diagram of a data source during pre-execution of transactions in a transaction pre-execution stage according to an embodiment of this disclosure. A block chain node 60*a* shown in FIG. 6 may be the first block chain node described above. As shown in FIG. 6, when the block chain node executes a transaction K (for example, transaction 3 described above) in advance in the transaction pre-execution stage, the block chain node may obtain a service contract used for executing the transaction K, so that data read from a block chain ledger shown in FIG. 6 may be taken as a transaction read data set for executing the transaction K via the service contract. In this way, when invoking the service contract to execute the transaction K, the block chain node may execute the transaction K via the transaction read data set of the transaction K, to obtain a transaction write data set of the transaction K. At this time, the block chain node may collectively take the transaction read data set of the transaction K and the transaction read data set of the transaction K as a transaction execution result of the transaction K. For the transaction read data set of the transaction K read from the block chain ledger, it can be A=1 shown in FIG. 6. For example, for a block chain electronic bill service, A may be used for representing register information of an invoicing enterprise for issuing an electronic bill. At this time, 1 may be used for indicating a current invoicing enterprise name of the invoicing enterprise, and the like. It is understood that the transaction K shown in FIG. 6 may be any one of the above M transactions.

The specific implementation of step S204 may refer to the description of step S101 in the embodiment corresponding to FIG. 3 above, and will not be repeatedly described here.

Step S205. Take, after the block consensus succeeds, transactions identical to the M transactions as a first type of transactions in the to-be-processed block, and take the first transaction execution results associated with the M transactions as to-be-processed transaction execution results of the first type of transactions.

The first transaction execution results associated with the M transactions are stored in transaction cache regions associated with the M transactions. At this time, the block chain node (namely, the first block chain node) may take, after the block consensus succeeds, the to-be-processed block that succeeds in the block consensus as a proposal block, and may obtain, during executing the N transactions in the proposal block, the first transaction execution results associated with the M transactions from the transaction cache regions. Further, the block chain node (namely, the first block chain node) may search the proposal block for the transactions identical to the M transactions. Further, the block chain node (namely, the first block chain node) may take the found transactions as the first type of transactions, and take the first transaction execution results associated with the M transactions as the to-be-processed transaction execution result of the first type of transactions.

The specific implementation of step S205 may refer to the description of step S102 in the embodiment corresponding to FIG. 3 above, and will not be repeatedly described here.

Step S206. Take (N−M) transactions in the to-be-processed block other than the first type of transactions as a second type of transactions, and execute the second type of transactions in parallel to obtain second transaction execution results associated with the second type of transactions.

Specifically, the block chain node (namely, the first block chain node) may take the (N−M) transactions in the proposal block other than the first type of transactions as the second type of transactions in a case that the to-be-processed block is a proposal block. Further, the block chain node (namely, the first block chain node) may obtain service contracts associated with the second type of transactions, and read transaction read data sets of the second type of transactions on the basis of the service contracts associated with the second type of transactions. Further, the block chain node (namely, the first block chain node) may execute the second type of transactions in parallel on the basis of the transaction read data sets of the second type of transactions to obtain transaction write data sets of the second type of transactions. Further, the block chain node (namely, the first block chain node) may obtain, according to the transaction read data sets of the second type of transactions and the transaction write data sets of the second type of transactions, the second transaction execution results associated with the second type of transactions.

It is understood that in the transaction pre-execution stage, data required by the block chain node to pre-execute the transactions is all from the block chain ledger. However, in the improved execution stage, for the to-be-processed block (namely, the proposal block described above) after the block consensus succeeds, data sources of transactions executed in parallel in the proposal block not only include data in the block chain ledger, but also include data changed by a preceding transaction in the proposal block (namely, data of a preceding transaction currently combined and written to a block cache of the proposal block).

Figure 7:
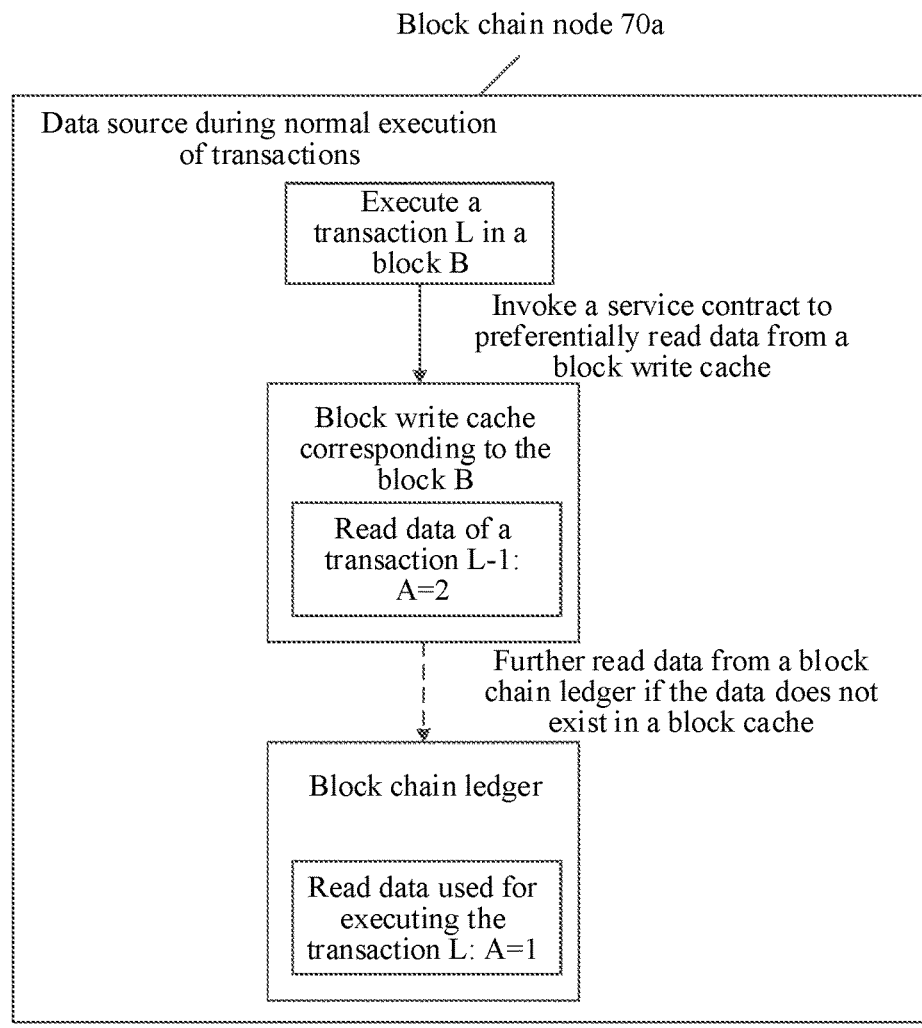
FIG. 7 is a schematic diagram of a data source during execution of remaining transactions in a block in an improved transaction execution stage according to an embodiment of this disclosure.

To facilitate understanding, further, referring to FIG. 7, FIG. 7 is a schematic diagram of a data source during execution of remaining transactions in a block in an improved transaction execution stage according to an embodiment of this disclosure. A block chain node 70*a* shown in FIG. 7 may be the first block chain node described above. As shown in FIG. 7, when a block chain node executes a transaction L (for example, transaction 4 described above) in a proposal block (namely, a block B shown in FIG. 7) in an improved transaction execution stage, the block chain node may obtain a service contract used for executing the transaction L, and data may be preferentially read from a block write buffer of the block B shown in FIG. 7 via the service contract. If the block chain node reads a transaction write data set of a preceding transaction (for example, a transaction L−1, where the transaction L−1 may be transaction 3 described above) of the transaction L from the block write buffer of the block B, it is then necessary to determine whether the transaction write data set of the preceding transaction (for example, the transaction L−1) that is currently read during combining transaction execution results in sequence is kept consistent with a transaction read data set used for executing transaction L in the improved transaction execution stage. For example, in the process of combining the transaction execution results in sequence, if the data which can affect the preceding transaction (for example, the transaction L−1 shown in FIG. 7) of the transaction L is read, according to a normal transaction execution process, from the block write cache corresponding to the block B shown in FIG. 7, the transaction write data set of the transaction L−1 read from the block write cache of the block B may be taken as the transaction read data set of the transaction L (namely, new data currently used for executing the transaction L during the combining the transaction execution results in sequence). At this time, the block chain node may compare whether the transaction write data set of the transaction L−1 read from the block write cache (namely, the data currently used for executing the transaction L, for example, the data in the block write cache shown in FIG. 7: A=2) is kept consistent with the transaction read data set used for executing the transaction L in the improved transaction execution stage (namely, data used for executing the transaction L before the combining the transaction execution results in sequence, for example, data in the block chain ledger shown in FIG. 7: A=1). If the transaction write data set is not consistent with the transaction read data set, it indirectly indicates that the transaction write data set obtained during the pre-execution of transaction 3 may be changed by other preceding transactions arranged in the same block. Therefore, the transaction L in the block B needs to be re-executed according to the currently changed transaction write data set (namely, the changed new data of transaction 3 read from the block cache: A=2) of transaction 3 read from the block cache corresponding to the block B, to obtain a new transaction write data set of the transaction L, so that a new transaction execution result of the transaction L may be obtained according to the new transaction read data set of the transaction L and the transaction write data set of the transaction L.

If the preceding transaction (for example, the transaction L−1 shown in FIG. 7) that can affect the transaction L is not read in the block write cache of the block B, data may be further read from the block chain ledger shown in FIG. 7, namely, the data used for executing the transaction L may be read from the block chain ledger shown in FIG. 7, so that in the improved transaction execution stage, the data read from the block chain ledger may be taken as a transaction read data set used for executing the transaction L, for example, A=1 shown in FIG. 7. It is understood that the transaction L shown in FIG. 7 may be any one of the above (N−M) transactions. At this time, the block chain node may consider that the data (for example, the data in the block chain ledger shown in FIG. 7: A=1) obtained from the block chain ledger and used for executing the transaction L is kept consistent with the data read from the block chain ledger during the combining the transaction execution results in sequence.

The specific implementation of step S206 may refer to the description of step S103 in the embodiment corresponding to FIG. 3 above, and will not be repeatedly described here.

Step S207. Take transactions among the N transactions other than the first transaction as to-be-detected transactions in the to-be-processed block.

The first transaction is a transaction of the N transactions having a minimum transaction execution serial number.

Step S208. Combine and write, in a case that the first transaction is a transaction among the first type of transactions, a transaction execution result of the first transaction among the to-be-processed transaction execution results to the block cache of the to-be-processed block on the basis of the transaction execution serial number of the first transaction.

Step S209. Determine preceding transactions of the to-be-detected transactions on the basis of the transaction execution serial numbers of the N transactions in the to-be-processed block.

The preceding transactions contain the first transaction, and the preceding transactions are transactions that are found in the to-be-processed block and have the transaction execution serial numbers earlier than the transaction execution serial numbers of the to-be-detected transactions.

Step S210. Take the transaction execution results corresponding to the to-be-detected transactions from the to-be-processed transaction execution results and the second transaction execution results as to-be-combined transaction execution results, obtain transaction read data sets of the to-be-detected transactions from the to-be-combined transaction execution results, obtain transaction write data sets of the preceding transactions from the block cache, and perform conflict detection on the to-be-detected transactions on the basis of the transaction write data sets of the preceding transactions, the transaction read data sets of the to-be-detected transactions, and a conflict detection condition, to obtain a conflict detection result.

Step S211. Take, in a case that the conflict detection result indicates that the to-be-detected transactions do not contain a to-be-detected transaction satisfying the conflict detection condition, to-be-detected transactions among the to-be-detected transactions that do not satisfy the conflict detection condition as combinable transactions, and combine, in sequence from the to-be-processed transaction execution results and the second transaction execution results, the transaction execution results corresponding to the combinable transactions, to obtain the sequential combination execution result corresponding to the block cache.

After executing step S210 above, the block chain node may also execute the following steps: taking, in a case that the conflict detection result indicates that the to-be-detected transactions contains a to-be-detected transaction satisfying the conflict detection condition, the to-be-detected transaction satisfying the conflict detection condition as a conflicting transaction. Further, the block chain node (namely, the first block chain node) may obtain a service contract corresponding to the conflicting transaction, read, from the block cache on the basis of the obtained service contract corresponding to the conflicting transaction, the transaction write data set of the preceding transaction corresponding to the conflicting transaction, and take the transaction write data set of the preceding transaction corresponding to the conflicting transaction as a transaction read data set of the conflicting transaction. Further, the block chain node (namely, the first block chain node) may re-execute the conflicting transaction on the basis of the transaction read data set of the conflicting transaction, to obtain a transaction write data set of the conflicting transaction, obtain a target transaction execution result of the conflicting transaction on the basis of the transaction read data set of the conflicting transaction and the transaction write data set of the conflicting transaction, take the transaction execution result of the conflicting transaction from the to-be-processed transaction execution results and the second transaction execution results as an initial transaction execution result, and update the initial transaction execution result on the basis of the target transaction execution result, to obtain updated to-be-processed transaction execution results and updated second transaction execution results. Further, the block chain node (namely, the first block chain node) may combine the updated to-be-processed transaction execution results with the updated second transaction execution results in sequence, to obtain the sequential combination execution result associated with a block cache of the to-be-processed block.

The specific implementations of step S207 to step S211 may refer to the description of step S104 in the embodiment corresponding to FIG. 3 above and will not be repeatedly described here.

In some embodiments, when the to-be-processed block is a proposal block, the block chain node may also perform serialization processing on a block header of the proposal block, the N transactions, and the sequential combination execution result, to obtain a block data set corresponding to the proposal block, and then may write a block height of the proposal block and the block data set in the form of a key-value pair to the block chain ledger maintained by a block chain network where the block chain node is located.

This embodiment of this disclosure can execute some (namely, the foregoing M transactions) of the N transactions in advance during the transaction packing, the block broadcasting and the block consensus. In this way, after the block consensus succeeds, during the further execution of the to-be-processed block, a computer device may directly take the transaction execution results of the M transactions that have been executed in advance as the transaction execution results of the first type of transactions in the to-be-processed block, so that the system resources can be rationally used in the process from the transaction packing to the block consensus. This means that: This embodiment of this disclosure only needs to execute the unexecuted (N–M) transactions in the to-be-processed block in parallel after the block consensus succeeds, without executing all the transactions in the to-be-processed block in parallel, so that the problem of preemption of the system resources caused by executing a large number of transactions in parallel can be solved from the root. This means that: This embodiment of this disclosure can improve the block processing efficiency of the whole block from the root by executing transactions in a block in parallel in stages. It is understood that the embodiments of this disclosure can ensure the accuracy of the sequential combination execution result obtained during the subsequent combining the transaction execution results in sequence by performing, in the process of combining the transaction execution results in sequence, the conflict detection on the above to-be-processed transaction execution results and the second transaction execution results which need to be combined, and thus can ensure the reliability of data subsequently written to the block chain ledger.

Figure 8:
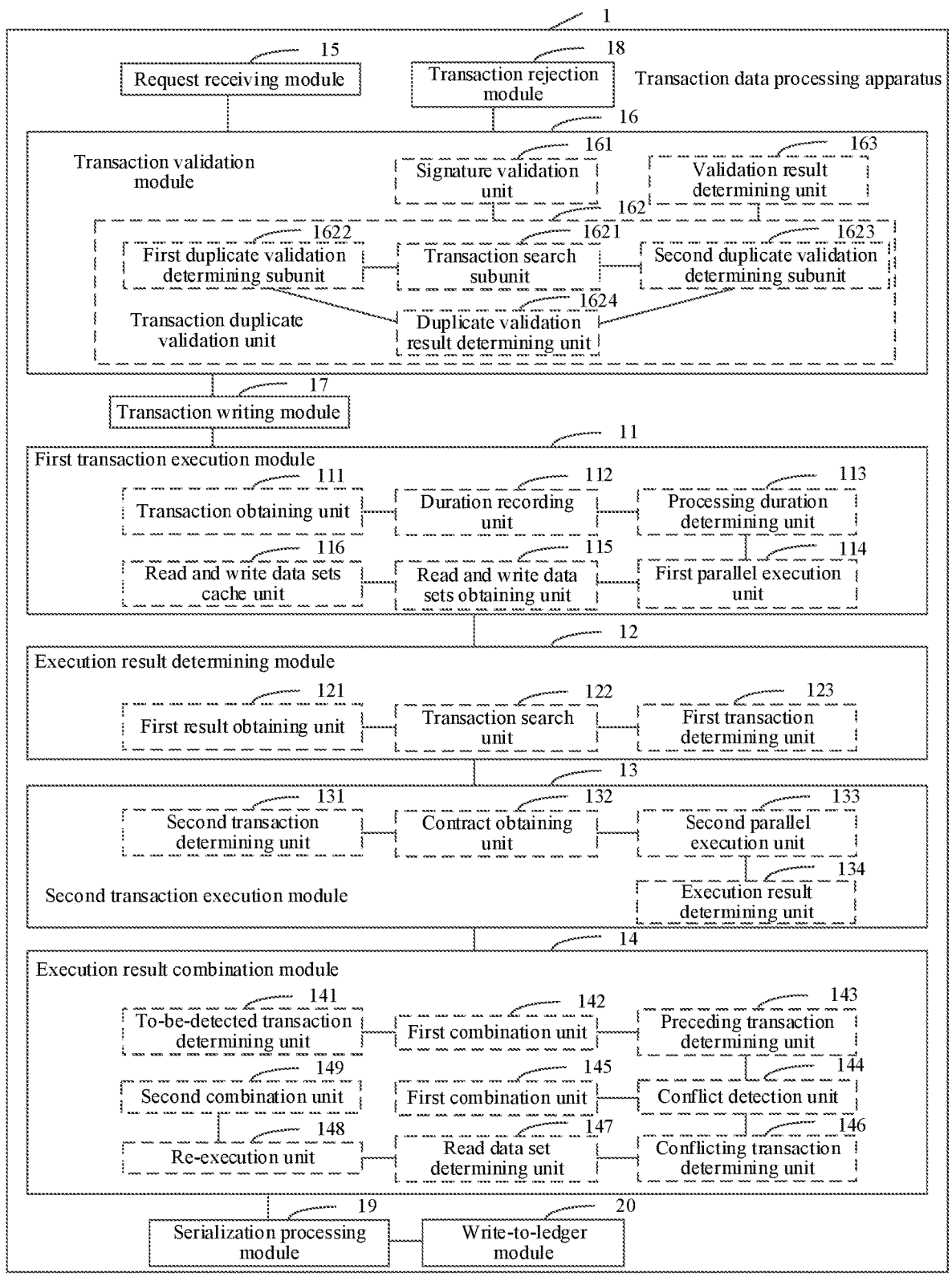
FIG. 8 is a schematic structural diagram of a transaction data processing apparatus according to this disclosure.

Further, referring to FIG. 8, FIG. 8 is a schematic structural diagram of a transaction data processing apparatus according to this disclosure. As shown in FIG. 8, a transaction data processing apparatus 1 may be applied to any block chain node in the above consensus network. For example, the transaction data processing apparatus 1 may be applied to node 10c in the embodiment corresponding to FIG. 1 above. It is understood that the transaction data processing apparatus 1 may be a computer-readable instruction (including a program code) run in a block chain node (such as foregoing node 10c). For example, the transaction data processing apparatus 1 may be application software. It can be understood that the transaction data processing apparatus 1 may be configured to perform the corresponding steps in the method provided by the embodiments of this disclosure. As shown in FIG. 8, the transaction data processing apparatus 1 may include: a first transaction execution module 11, an execution result determining module 12, a second transaction execution module 13, and an execution result combination module 14. The transaction data processing apparatus 1 may further include: a request receiving module 15, a transaction validation module 16, a transaction writing module 17, a transaction rejection module 18, a serialization processing module 19, and a write-to-ledger module 20.

The first transaction execution module 11 is configured to: obtain N transactions in a transaction pool, and execute M transactions among the N transactions in parallel during a process of packing the N transactions to a to-be-processed block and performing block consensus on the to-be-processed block, to obtain first transaction execution results associated with the M transactions, M being a positive integer less than or equal to N.

The first transaction execution module 11 includes: a transaction obtaining unit 111, a duration recording unit 112, a processing duration determining unit 113, and a first parallel execution unit 114. In an embodiment, the first transaction execution module 11 further includes: a read and write data sets obtaining unit 115 and a read and write data sets cache unit 116.

The transaction obtaining unit 111 is configured to obtain the N transactions from a to-be-executed transaction space of the transaction pool, and write, on the basis of transaction execution serial numbers of the N transactions, the N transactions to a to-be-processed queue corresponding to the to-be-executed transaction space.

The duration recording unit 112 is configured to record, in the process of packing the N transactions to a to-be-processed block and performing block consensus on the to-be-processed block, a block packing duration, a block check duration and a voting consensus duration which are associated with the to-be-processed block.

The processing duration determining unit 113 is configured to determine a service processing duration associated with the N transactions on the basis of the block packing duration, the block check duration and the voting consensus duration.

The first parallel execution unit 114 is configured to execute the N transactions in the to-be-processed queue in parallel according to a transaction thread pool corresponding to the to-be-processed queue, determine, within the service processing duration, the M transactions among the N transactions executed in parallel by a working thread in the transaction thread pool, and obtain the first transaction execution results associated with the M transactions according to transaction read data sets of the M transactions and transaction write data sets of the M transactions.

In an embodiment, the first transaction execution results include transaction execution results of the M transactions, and the transaction execution result of one transaction includes a transaction read data set of the transaction and a transaction write data set of the transaction.

The read and write data sets obtaining unit 115 is configured to obtain a to-be-cached transaction from the M transactions, and obtain the transaction read data set of the to-be-cached transaction and the transaction write data set of the to-be-cached transaction from the transaction execution results of the M transactions.

The read and write data sets cache unit 116 is configured to cache the transaction read data set of the to-be-cached transaction and the transaction write data set of the to-be-cached transaction to a transaction cache corresponding to the to-be-cached transaction.

The specific implementations of the transaction obtaining unit 111, the duration recording unit 112, the processing duration determining unit 113, the first parallel execution unit 114, and the read and write data sets obtaining unit 115 and the read and write data sets cache unit 116 may refer to the description of step S101 in the embodiment corresponding to FIG. 3 above, and will not be described in detain here.

The execution result determining module 12 is configured to: take, after the block consensus succeeds, transactions identical to the M transactions as a first type of transactions in the to-be-processed block, and take the first transaction execution results associated with the M transactions as to-be-processed transaction execution results of the first type of transactions.

The first transaction execution results associated with the M transactions are stored in transaction cache regions associated with the M.

The execution result determining module 12 includes: a first result obtaining unit 121, a transaction search unit 122, and a first transaction determining unit 123.

The first result obtaining unit 121 is configured to take, after the block consensus succeeds, the to-be-processed block that succeeds in the block consensus as a proposal block, and obtain, during executing the N transactions in the proposal block, the first transaction execution results associated with the M transactions from the transaction cache regions.

The transaction search unit 122 is configured to search the proposal block for the transactions identical to the M transactions.

The first transaction determining unit 123 is configured to: take the found transactions as the first type of transactions, and take the first transaction execution results associated with the M transactions as the to-be-processed transaction execution result of the first type of transactions.

The specific implementations of the first result obtaining unit 121, the transaction search unit 122, and the first transaction determining unit 123 may refer to the description of step S102 in the embodiment corresponding to FIG. 3 above, and will not be described in detail here.

The second transaction execution module 13 is configured to: take (N–M) transactions in the to-be-processed block other than the first type of transactions as a second type of transactions, and execute the second type of transactions in parallel to obtain second transaction execution results associated with the second type of transactions.

The second transaction execution module 13 includes: a second transaction determining unit 131, a contract obtaining unit 132, a second parallel execution unit 133, and an execution result determining unit 134.

The second transaction determining unit 131 is configured to take the (N–M) transactions in the proposal block other than the first type of transactions as the second type of transactions in a case that the to-be-processed block is a proposal block.

The contract obtaining unit 132 is configured to: obtain service contracts associated with the second type of transactions, and read transaction read data sets of the second type of transactions on the basis of the service contracts associated with the second type of transactions.

The second parallel execution unit 133 is configured to execute the second type of transactions in parallel on the basis of the transaction read data sets of the second type of transactions to obtain transaction write data sets of the second type of transactions.

The execution result determining unit 134 is configured to obtain, according to the transaction read data sets of the second type of transactions and the transaction write data sets of the second type of transactions, the second transaction execution results associated with the second type of transactions.

The specific implementations of the second transaction determining unit 131, the contract obtaining unit 132, the second parallel execution unit 133, and the execution result determining unit 134 may refer to the description of step S103 in the embodiment corresponding to FIG. 3 above, and will not be described in detail here.

The execution result combination module 14 is configured to: combine the to-be-processed transaction execution results with the second transaction execution results in sequence on the basis of transaction execution serial numbers of the N transactions in the to-be-processed block, to obtain a sequential combination execution result associated with a block cache of the to-be-processed block.

The execution result combination module 14 includes: a to-be-detected transaction determining unit 141, a first combination unit 142, a preceding transaction determining unit 143, a conflict detection unit 144, and a first combination unit 145. In an embodiment, the execution result combination module 14 further includes: a conflicting transaction determining unit 146, a read data set determining unit 147, a re-execution unit 148, and a second combination unit 149.

The to-be-detected transaction determining unit 141 is configured to take transactions among the N transactions other than the first transaction as to-be-detected transactions in the to-be-processed block. The first transaction is a transaction of the N transactions having a minimum transaction execution serial number.

The first combination unit 142 is configured to combine and write, in a case that the first transaction is a transaction among the first type of transactions, a transaction execution result of the first transaction among the to-be-processed transaction execution results to the block cache of the to-be-processed block on the basis of the transaction execution serial number of the first transaction.

The preceding transaction determining unit 143 is configured to determine preceding transactions of the to-be-detected transactions on the basis of the transaction execution serial numbers of the N transactions in the to-be-processed block. The preceding transactions contain the first transaction, and the preceding transactions are transactions that are found in the to-be-processed block and have the transaction execution serial numbers earlier than the transaction execution serial numbers of the to-be-detected transactions.

The conflict detection unit 144 is configured to: take the transaction execution results corresponding to the to-be-detected transactions from the to-be-processed transaction execution results and the second transaction execution results as to-be-combined transaction execution results, obtain transaction read data sets of the to-be-detected transactions from the to-be-combined transaction execution results, obtain transaction write data sets of the preceding transactions from the block cache, and perform conflict detection on the to-be-detected transactions on the basis of the transaction write data sets of the preceding transactions, the transaction read data sets of the to-be-detected transactions, and a conflict detection condition, to obtain a conflict detection result.

The first combination unit 145 is configured to take, in a case that the conflict detection result indicates that the to-be-detected transactions do not contain a to-be-detected transaction satisfying the conflict detection condition, to-be-detected transactions among the to-be-detected transactions that do not satisfy the conflict detection condition as combinable transactions, and combine, in sequence from the to-be-processed transaction execution results and the second transaction execution results, the transaction execution results corresponding to the combinable transactions, to obtain the sequential combination execution result corresponding to the block cache.

In an embodiment, the conflicting transaction determining unit 146 is configured to take, in a case that the conflict detection result indicates that the to-be-detected transactions contains a to-be-detected transaction satisfying the conflict detection condition, the to-be-detected transaction satisfying the conflict detection condition as a conflicting transaction.

The read data set determining unit 147 is configured to: obtain a service contract corresponding to the conflicting transaction, read, from the block cache on the basis of the obtained service contract corresponding to the conflicting transaction, the transaction write data set of the preceding transaction corresponding to the conflicting transaction, and take the transaction write data set of the preceding transaction corresponding to the conflicting transaction as a transaction read data set of the conflicting transaction.

The re-execution unit 148 is configured to: re-execute the conflicting transaction on the basis of the transaction read data set of the conflicting transaction, to obtain a transaction write data set of the conflicting transaction, obtain a target transaction execution result of the conflicting transaction on the basis of the transaction read data set of the conflicting transaction and the transaction write data set of the conflicting transaction, take the transaction execution result of the conflicting transaction from the to-be-processed transaction execution results and the second transaction execution results as an initial transaction execution result, and update the initial transaction execution result on the basis of the target transaction execution result, to obtain updated to-be-processed transaction execution results and updated second transaction execution results.

The second combination unit 149 is configured to combine the updated to-be-processed transaction execution results with the updated second transaction execution results in sequence, to obtain the sequential combination execution result associated with a block cache of the to-be-processed block.

The specific implementations of the to-be-detected transaction determining unit 141, the first combination unit 142, the preceding transaction determining unit 143, the conflict detection unit 144, the first combination unit 145, the conflicting transaction determining unit 146, the read data set determining unit 147, the re-execution unit 148, and the second combination unit 149 may refer to the description of the specific process of combining the transaction execution results in sequence in the embodiment corresponding to FIG. 3 above, and will not be described in detail here.

The specific implementations of the first transaction execution module 11, the execution result determining module 12, the second transaction execution module 13, and the execution result combination module 14 may refer to the descriptions of step S101 to step S104 in the embodiment corresponding to FIG. 3 above, and will not be described in detail here.

The transaction data processing apparatus 1 may be run on a first block chain node in a core consensus network. The core consensus network further includes a second block chain node in addition to the first block chain node. The first block chain node is a node determined in the core consensus network and used for performing packing to obtain a to-be-processed block.

In an embodiment, before the first transaction execution module 10 obtains the N transactions in the transaction pool, the request receiving module 15 to receive a transaction request broadcast by the second block chain node and associated with a block chain client. A to-be-processed transaction carried in the transaction request is generated after the block chain client packs service data inputted by a service object.

The transaction validation module 16 is configured to perform transaction validation on the to-be-processed transaction carried in the transaction request, to obtain a transaction validation result.

The transaction request carries transaction signature information of the service object. The transaction signature information is obtained after the block chain client signs the to-be-processed transaction through an object private key of the service object.

The transaction validation module 16 includes: a signature validation unit 161, a transaction duplicate validation unit 162, and a validation result determining unit 163.

The signature validation unit 161 is configured to: extract the to-be-processed transaction from the transaction request, obtain a service public key corresponding to the object private key of the service object in a block chain network where the core consensus network is located, and perform signature validation on the transaction signature information via the service public key.

The transaction duplicate validation unit 162 is configured to perform, in a case that the signature validation succeeds, transaction duplicate validation on the to-be-processed transaction on the basis of a block chain ledger maintained by the block chain network, to obtain a transaction duplicate validation result.

The transaction duplicate validation unit 162 includes: a transaction search subunit 1621, a first duplicate validation determining subunit 1622, a second duplicate validation determining subunit 1623, and a duplicate validation result determining unit 1624.

The transaction search subunit 1621 is configured to: obtain, in a case that the signature validation succeeds, a transaction duplicate validator associated with the transaction pool, and search, on the basis of the transaction duplicate validator, for an on-chain transaction identical to the to-be-processed transaction in the block chain ledger maintained by the block chain network.

The first duplicate validation determining subunit 1622 is configured to take, in a case that the on-chain transaction identical to the to-be-processed transaction is not found in the block chain ledger, a non-duplicate-transaction duplicate validation result, indicating that the on-chain transaction identical to the to-be-processed transaction is not found in the block chain ledger, as a first transaction duplicate validation result.

The second duplicate validation determining subunit 1623 is configured to take, in a case that the on-chain transaction identical to the to-be-processed transaction is found in the block chain ledger, a duplicate-transaction duplicate validation result, indicating that the on-chain transaction identical to the to-be-processed transaction is found in the block chain ledger, as a second transaction duplicate validation result.

The duplicate validation result determining unit 1624 is configured to take the first transaction duplicate validation result as the transaction duplicate validation result after the transaction duplicate validation is performed on the to-be-processed transaction.

The duplicate validation result determining unit 1624 is further configured to take the second transaction duplicate validation result as the transaction duplicate validation result after the transaction duplicate validation is performed on the to-be-processed transaction.

The specific implementations of the transaction search subunit 1621, the first duplicate validation determining subunit 1622, the second duplicate validation determining subunit 1623, and the duplicate validation result determining unit 1624 may refer to the description of the specific implementation of the transaction duplicate validation in the embodiment corresponding to FIG. 5 above, and will not be described in detail here.

The validation result determining unit 163 is configured to determine the transaction validation result corresponding to the to-be-processed transaction on the basis of the transaction duplicate validation result.

The specific implementations of the signature validation unit 161, the transaction validation unit 162, and the validation result determining unit 163 may refer to the description of the transaction validation stage in the embodiment corresponding to FIG. 2 above, and will not be described in detail here.

The transaction writing module 17 is configured to: take the to-be-processed transaction as a valid transaction in a case that the transaction validation result indicates that the transaction validation succeeds, and write the valid transaction to the transaction pool of the first block chain node.

In an embodiment, the transaction rejection module 18 is configured to: take the to-be-processed transaction as an invalid transaction in a case that the transaction validation result indicates that the transaction validation fails, and reject to write the invalid transaction to the transaction pool of the first block chain node.

The specific implementations of the request receiving module 15, the transaction validation module 16, the transaction writing module 17, and the transaction rejection module 18 may refer to the descriptions of step S201 to step S203 in the embodiment corresponding to FIG. 5 above, and will not be described in detail here.

In an embodiment, the serialization processing module 19 is configured to perform serialization processing on a block header of the proposal block, the N transactions, and the sequential combination execution result in a case that the to-be-processed block is a proposal block, to obtain a block data set corresponding to the proposal block.

The write-to-ledger module 20 is configured to write a block height of the proposal block and the block data set to a block chain ledger maintained by the block chain network where the block chain node is located.

The specific implementations of the serialization processing module 19 and the write-to-ledger module 20 may refer to the description of the specific implementation of the save-to-ledger stage in the embodiment corresponding to FIG. 2 or FIG. 5 above, and will not be described in detail here. It can be understood that the description of the beneficial effects of the same method will not be repeated.

Figure 9:
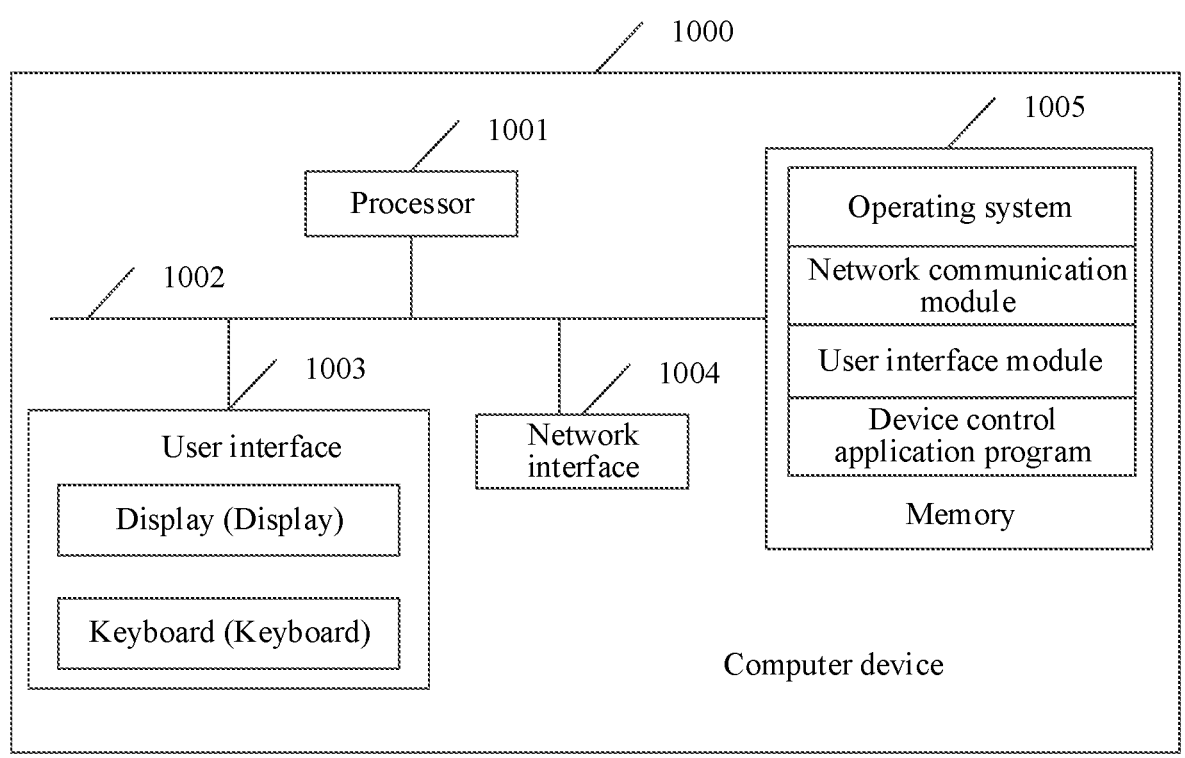
FIG. 9 is a schematic structural diagram of a computer device according to an embodiment of this disclosure.

Further, referring to FIG. 9, FIG. 9 is a schematic structural diagram of a computer device according to an embodiment of this disclosure. As shown in FIG. 9, a computer device 1000 may be applied to the block chain node in the corresponding embodiment of FIG. 1 above. The computer device 1000 may include: a processor 1001 (processing circuitry), a network interface 1004, and a memory 1005 (non-transitory computer-readable storage medium). In addition, the computer device 1000 may further include: a user interface 1003 and at least one communication bus 1002. The communication bus 1002 is used for realizing connection and communication between these components. It is understood that in some embodiments, the user interface 1003 may include a display and a keyboard. Or, the user interface 1003 may include a standard wired interface and a standard wireless interface. The network interface 1004 may include a standard wired interface and a standard wireless interface (such as a WI-FI interface). The memory 1005 may be either a high-speed random access memory (RAM) or a non-volatile memory, for example, at least one disk memory. The memory 1005 may be at least one memory apparatus located far away from the aforementioned processor 1001. As shown in FIG. 9, the memory 1005, as a computer storage medium, may include an operating system, a network communication module, a user interface module, and a device control application program.

The network interface 1004 in the computer device 1000 may also provide a network communication function. In the computer device 1000 shown in FIG. 9, the network interface 1004 may provide a network communication function. The user interface 1003 is mainly used for providing an interface for a user to type. The processor 1001 may be configured to invoke the device control application program stored in the memory 1005 to implement the description of the transaction data processing method in the embodiment corresponding to FIG. 3 or FIG. 5 above, or may execute the description of the transaction data processing apparatus 1 in the embodiment corresponding to FIG. 8 above, which will not be described in detail here. In addition, the description of beneficial effects of the same method are not described here again.

Furthermore, it is pointed out here that: The embodiments of this disclosure further provide a computer-readable storage medium. The computer-readable storage medium stores computer-readable instructions executed by the aforementioned transaction data processing apparatus 1, and the computer-readable instructions include program instructions which, when executed by a processor, can perform the description of the transaction data processing method in the embodiment corresponding to FIG. 3 or FIG. 5, which will not be described in detail here. In addition, the description of beneficial effects of the same method are not described here again. For technical details not disclosed in this embodiment of the computer-readable storage medium in this disclosure, refer to the description of the method embodiment of this disclosure. As an example, program instructions may be deployed on one computing device for execution, or on a plurality of computing devices located at one site, or on a plurality of computing devices distributed at a plurality of sites and interconnected by a communication network. The plurality of computing devices distributed at the plurality of sites and interconnected by the communication network may form a block chain system.

In addition, the embodiments of this disclosure further provide a computer program product. The computer program product may include computer instructions which may be stored in a computer-readable storage medium. A processor of a computer device reads the computer instructions from the computer-readable storage medium, and the processor may execute the computer instructions, causing the computer device to perform the descriptions of the transaction data processing method in the embodiment corresponding to FIG. 3 or FIG. 5, which will not be described in detail here. In addition, the description of beneficial effects of the same method are not described here again. For technical details not disclosed in this embodiment of the computer program product in this disclosure, refer to the description of the method embodiment of this disclosure.

It is understood by those of ordinary skill in the art that all or part of the processes in the method of the embodiments described above may be implemented by instructing relevant hardware by a computer program. The computer program may be stored in a computer-readable storage medium, and the program, when executed, may include the processes of the embodiments of the methods described above. The storage medium may be a magnetic disk, an optical disk, read-only memory (ROM), an RAM, or the like.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The foregoing disclosure includes some exemplary embodiments of this disclosure which are not intended to limit the scope of this disclosure. Other embodiments shall also fall within the scope of this disclosure.

What is claimed is:

1. A transaction data processing method, performed by a block chain node, the method comprising:
    obtaining N transactions in a transaction pool, and executing M transactions among the N transactions in parallel during a process of packing the N transactions into a block and performing block consensus on the block, to obtain first transaction execution results associated with the M transactions, M being a positive integer less than or equal to N;
    identifying, after the block consensus succeeds, transactions identical to the M transactions as a first type of transactions in the block, and classifying the first transaction execution results associated with the M transactions as pre-execution transaction execution results of the first type of transactions;
    identifying transactions in the block other than the first type of transactions as a second type of transactions, and executing, after the block consensus succeeds, the second type of transactions in parallel to obtain second transaction execution results associated with the second type of transactions; and
    combining the pre-execution transaction execution results with the second transaction execution results in sequence based on transaction execution serial numbers of the N transactions in the block, to obtain a sequential combination execution result associated with a block cache of the block.

2. The method according to claim 1, wherein
    the block chain node is a first block chain node in a core consensus network;
    the core consensus network further comprises a second block chain node in addition to the first block chain node;
    the transaction pool is a transaction pool of the first block chain node; and
    the method further comprises:
        receiving a transaction request broadcast by the second block chain node, the transaction request being associated with a block chain client, a transaction requested in the transaction request being based on service data input into the block chain client by a service user;
        performing transaction validation on the transaction of the transaction request, to obtain a transaction validation result; and
        identifying the transaction as a valid transaction when the transaction validation result indicates that the transaction validation succeeds, and writing the valid transaction to the transaction pool of the first block chain node.

3. The method according to claim 2, further comprising:
    identifying the transaction as an invalid transaction when the transaction validation result indicates that the transaction validation fails, and rejecting to write the invalid transaction to the transaction pool of the first block chain node.

4. The method according to claim 2, wherein
    the transaction request includes transaction signature information of the service user;
    the transaction signature information is generated by signing the transaction by a private key of the service user in the block chain client; and
    the performing the transaction validation comprises:
        extracting the transaction from the transaction request, obtaining a service public key corresponding to the private key of the service user in a block chain network where the core consensus network is located, and performing signature validation on the transaction signature information via the service public key;
        performing, when the signature validation succeeds, transaction duplicate validation on the transaction based on a block chain ledger maintained by the block chain network, to obtain a transaction duplicate validation result; and
        determining the transaction validation result corresponding to the transaction based on the transaction duplicate validation result.

5. The method according to claim 4, wherein the performing, when the signature validation succeeds, the transaction duplicate validation comprises:
    searching for an on-chain transaction identical to the transaction in the block chain ledger maintained by the block chain network; and
    generating, in response to a determination that the on-chain transaction identical to the transaction is not found in the block chain ledger, a non-duplicate-transaction duplicate validation result, indicating that the on-chain transaction identical to the transaction is not found in the block chain ledger.

6. The method according to claim 5, further comprising:
    generating, in response to a determination that the on-chain transaction identical to the transaction is found in the block chain ledger, a duplicate-transaction duplicate validation result, indicating that the on-chain transaction identical to the transaction is found in the block chain ledger.

7. The method according to claim 1, wherein the obtaining the N transactions in the transaction pool, and the executing the M transactions among the N transactions in parallel during the process of packing the N transactions into the block and performing the block consensus on the block comprises:
    obtaining the N transactions from a transaction space of the transaction pool, and writing, based on the transaction execution serial numbers of the N transactions, the N transactions to a queue corresponding to the transaction space;
    recording, in the process of packing the N transactions into the block and performing the block consensus on the block, a block packing duration, a block check duration, and a voting consensus duration which are associated with the block;
    determining a service processing duration associated with the N transactions based on the block packing duration, the block check duration, and the voting consensus duration; and
    within the service processing duration, executing the M transactions in the queue in parallel by a working thread in a transaction thread pool corresponding to the queue, and obtaining the first transaction execution results associated with the M transactions according to transaction read data sets of the M transactions and transaction write data sets of the M transactions.

8. The method according to claim 1, wherein
the first transaction execution results comprise transaction execution results of the M transactions, wherein a transaction execution result of each of the M transactions comprises a transaction read data set of the respective transaction and a transaction write data set of the respective transaction; and
the method further comprises:
caching the transaction read data set and the transaction write data set of each of the M transactions to a transaction cache corresponding to the respective one of the M transactions.

9. The method according to claim 1, wherein
the first transaction execution results associated with the M transactions are stored in transaction cache regions associated with the M transactions;
the identifying, after the block consensus succeeds, the transactions identical to the M transactions as the first type of transactions in the block, and classifying the first transaction execution results associated with the M transactions as the pre-execution transaction execution results of the first type of transactions comprises:
identifying, after the block consensus succeeds, the block as a proposal block, and obtaining the first transaction execution results associated with the M transactions from the transaction cache regions;
searching the proposal block for the transactions identical to the M transactions; and
identifying transactions found in the search as the first type of transactions, and classifying the first transaction execution results associated with the M transactions as the pre-execution transaction execution results of the first type of transactions.

10. The method according to claim 1, wherein the identifying the transactions in the block other than the first type of transactions as the second type of transactions, and executing the second type of transactions in parallel to obtain the second transaction execution results associated with the second type of transactions comprises:
after the block consensus succeeds,
identifying the transactions in the block other than the first type of transactions as the second type of transactions;
obtaining service contracts associated with the second type of transactions, and reading transaction read data sets of the second type of transactions based on the service contracts associated with the second type of transactions;
executing the second type of transactions in parallel based on the transaction read data sets of the second type of transactions to obtain transaction write data sets of the second type of transactions; and
obtaining, according to the transaction read data sets of the second type of transactions and the transaction write data sets of the second type of transactions, the second transaction execution results associated with the second type of transactions.

11. The method according to claim 1, wherein the combining the pre-execution transaction execution results with the second transaction execution results comprises:
identifying transactions that do not have a minimum transaction execution serial number among the N transactions as to-be-detected transactions in the block;
in response to a determination that a transaction having the minimum transaction execution serial number among the N transactions is one of the first type of transactions, writing a transaction execution result of the transaction having the minimum transaction execution serial number to the block cache of the block based on the minimum transaction execution serial number;
for each of the to-be-detected transactions, determining preceding transactions of the respective to-be-detected transaction as transactions of the block that have transaction execution serial numbers earlier than a transaction execution serial number of the respective to-be-detected transaction;
for each of the to-be-detected transactions, locating transaction execution results corresponding to the respective to-be-detected transaction from one of the pre-execution transaction execution results or the second transaction execution results, obtaining a transaction read data set of the respective to-be-detected transaction from the located transaction execution results, obtaining transaction write data sets of the preceding transactions of the respective to-be-detected transaction from the block cache, and performing conflict detection on the respective to-be-detected transaction based on the transaction write data sets of the preceding transactions, the transaction read data set of the respective to-be-detected transaction, and a conflict detection condition, to obtain a conflict detection result; and
for each of the to-be-detected transactions, identifying, in response to a determination that the conflict detection result indicates that the respective to-be-detected transaction does not satisfy the conflict detection condition, the respective to-be-detected transaction as a combinable transaction, and combining, in sequence, the located transaction execution results corresponding to the combinable transaction into the sequential combination execution result corresponding to the block cache.

12. The method according to claim 11, further comprising:
identifying, in response to a determination that the conflict detection result indicates that the respective to-be-detected transaction satisfies the conflict detection condition, the respective to-be-detected transaction satisfying the conflict detection condition as a conflicting transaction;
obtaining a service contract corresponding to the conflicting transaction, reading, from the block cache based on the obtained service contract corresponding to the conflicting transaction, a transaction write data set of a preceding transaction corresponding to the conflicting transaction, and taking the transaction write data set of the preceding transaction corresponding to the conflicting transaction as a transaction read data set of the conflicting transaction;
re-executing the conflicting transaction based on the transaction read data set of the conflicting transaction, to obtain a transaction write data set of the conflicting transaction, obtaining a target transaction execution result of the conflicting transaction based on the transaction read data set of the conflicting transaction and the transaction write data set of the conflicting transaction, classifying a transaction execution result of the conflicting transaction from the pre-execution transaction execution results or the second transaction execution results as an initial transaction execution result, and updating the initial transaction execution result based on the target transaction execution result, to obtain updated pre-execution transaction execution results or updated second transaction execution results; and combining the updated pre-execution transaction execution results or the updated second transaction execution results in sequence, to obtain the sequential combination execution result associated with the block cache of the block.

13. The method according to claim 1, further comprising:
after the block consensus succeeds,
performing serialization processing on a block header of the block, the N transactions, and the sequential combination execution result to obtain a block data set corresponding to the block; and
writing a block height of the block and the block data set to a block chain ledger maintained by a block chain network where the block chain node is located.

14. A transaction data processing apparatus, comprising: processing circuitry configured to
obtain N transactions in a transaction pool, and execute M transactions among the N transactions in parallel during a process of packing the N transactions into a block and performing block consensus on the block, to obtain first transaction execution results associated with the M transactions, M being a positive integer less than or equal to N;
identify, after the block consensus succeeds, transactions identical to the M transactions as a first type of transactions in the block, and classify the first transaction execution results associated with the M transactions as pre-execution transaction execution results of the first type of transactions;
identify transactions in the block other than the first type of transactions as a second type of transactions, and execute, after the block consensus succeeds, the second type of transactions in parallel to obtain second transaction execution results associated with the second type of transactions; and
combine the pre-execution transaction execution results with the second transaction execution results in sequence based on transaction execution serial numbers of the N transactions in the block, to obtain a sequential combination execution result associated with a block cache of the block.

15. The apparatus according to claim 14, wherein
the apparatus is a first block chain node in a core consensus network;
the core consensus network further comprises a second block chain node in addition to the first block chain node;
the transaction pool is a transaction pool of the first block chain node; and
the processing circuitry is further configured to:
receive a transaction request broadcast by the second block chain node, the transaction request being associated with a block chain client, a transaction requested in the transaction request being based on service data input into the block chain client by a service user;
perform transaction validation on the transaction of the transaction request, to obtain a transaction validation result; and
identify the transaction as a valid transaction when the transaction validation result indicates that the transaction validation succeeds, and writing the valid transaction to the transaction pool of the first block chain node.

16. The apparatus according to claim 15, wherein the processing circuitry is further configured to:
identify the transaction as an invalid transaction when the transaction validation result indicates that the transaction validation fails, and rejecting to write the invalid transaction to the transaction pool of the first block chain node.

17. The apparatus according to claim 15, wherein
the transaction request includes transaction signature information of the service user;
the transaction signature information is generated by signing the transaction by a private key of the service user in the block chain client; and
the processing circuitry is further configured to:
extract the transaction from the transaction request, obtaining a service public key corresponding to the private key of the service user in a block chain network where the core consensus network is located, and performing signature validation on the transaction signature information via the service public key;
perform, when the signature validation succeeds, transaction duplicate validation on the transaction based on a block chain ledger maintained by the block chain network, to obtain a transaction duplicate validation result; and
determine the transaction validation result corresponding to the transaction based on the transaction duplicate validation result.

18. The apparatus according to claim 17, wherein the processing circuitry is further configured to:
search for an on-chain transaction identical to the transaction in the block chain ledger maintained by the block chain network; and
generate, in response to a determination that the on-chain transaction identical to the transaction is not found in the block chain ledger, a non-duplicate-transaction duplicate validation result, indicating that the on-chain transaction identical to the transaction is not found in the block chain ledger.

19. The apparatus according to claim 18, wherein the processing circuitry is further configured to:
generate, in response to a determination that the on-chain transaction identical to the transaction is found in the block chain ledger, a duplicate-transaction duplicate validation result, indicating that the on-chain transaction identical to the transaction is found in the block chain ledger.

20. A non-transitory computer-readable storage medium storing computer-readable instructions thereon, which, when executed by processing circuitry, cause the processing circuitry to perform a transaction data processing method comprising:
obtaining N transactions in a transaction pool, and executing M transactions among the N transactions in parallel during a process of packing the N transactions into a block and performing block consensus on the block, to obtain first transaction execution results associated with the M transactions, M being a positive integer less than or equal to N;
identifying, after the block consensus succeeds, transactions identical to the M transactions as a first type of transactions in the block, and classifying the first transaction execution results associated with the M transactions as pre-execution transaction execution results of the first type of transactions;

identifying transactions in the block other than the first type of transactions as a second type of transactions, and executing, after the block consensus succeeds, the second type of transactions in parallel to obtain second transaction execution results associated with the second type of transactions; and combining the pre-execution transaction execution results with the second transaction execution results in sequence based on transaction execution serial numbers of the N transactions in the block, to obtain a sequential combination execution result associated with a block cache of the block.

* * * * *